United States Patent
Thangarasa et al.

(10) Patent No.: US 11,582,001 B2
(45) Date of Patent: Feb. 14, 2023

(54) METHOD FOR BAND SCANNING WHEN REFERENCE SIGNAL IS TRANSMITTED OVER REDUCED BANDWIDTH

(71) Applicant: Telefonaktiebolaget LM Ericsson (publ), Stockholm (SE)

(72) Inventors: Santhan Thangarasa, Vällingby (SE); Muhammad Kazmi, Sundbyberg (SE); Torgny Palenius, Barsebäck (SE); Kazuyoshi Uesaka, Kawasaki (JP)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 39 days.

(21) Appl. No.: 16/642,678

(22) PCT Filed: Oct. 1, 2018

(86) PCT No.: PCT/SE2018/051005
§ 371 (c)(1),
(2) Date: Feb. 27, 2020

(87) PCT Pub. No.: WO2019/070184
PCT Pub. Date: Apr. 11, 2019

(65) Prior Publication Data
US 2020/0204318 A1 Jun. 25, 2020

Related U.S. Application Data

(60) Provisional application No. 62/566,632, filed on Oct. 2, 2017.

(51) Int. Cl.
*H04L 5/00* (2006.01)
*H04J 11/00* (2006.01)
(Continued)

(52) U.S. Cl.
CPC ........ *H04L 5/0048* (2013.01); *H04J 11/0086* (2013.01); *H04L 5/001* (2013.01);
(Continued)

(58) Field of Classification Search
CPC ..... H04J 11/0069–0089; H04W 24/00; H04W 48/16; H04W 48/20; H04W 72/1278;
(Continued)

(56) References Cited

U.S. PATENT DOCUMENTS

| | | | |
|---|---|---|---|
| 10,171,215 B1 | 1/2019 | Oroskar et al. | |
| 2011/0292825 A1* | 12/2011 | Lee ...................... | H04L 5/0023 370/252 |

(Continued)

FOREIGN PATENT DOCUMENTS

| | | |
|---|---|---|
| CN | 104126323 A | 10/2014 |
| CN | 104137631 A | 11/2014 |

(Continued)

OTHER PUBLICATIONS

Japanese Office Action with English Summary Translation dated Jun. 7, 2021 for Japanese Patent Application No. 2020510523, consisting of 9-pages.

(Continued)

*Primary Examiner* — Michael Thier
*Assistant Examiner* — Prince A Mensah
(74) *Attorney, Agent, or Firm* — Christopher & Weisberg, P.A.

(57) ABSTRACT

Apparatuses and methods for band scanning in lean carrier operation are disclosed. In one embodiment, a method for a network node includes identifying at least one time period for transmitting a reference signal over a full cell bandwidth in lean earner operation, and transmitting a reference signal (Continued)

according to a bandwidth pattern. The bandwidth pattern is based at least in part on the identified at least one time period.

23 Claims, 18 Drawing Sheets

(51) Int. Cl.
*H04W 48/16* (2009.01)
*H04W 74/08* (2009.01)

(52) U.S. Cl.
CPC .......... *H04L 5/0053* (2013.01); *H04W 48/16* (2013.01); *H04W 74/0833* (2013.01)

(58) Field of Classification Search
CPC ......... H04W 74/0808; H04W 74/0833; H04W 76/28
See application file for complete search history.

(56) References Cited

U.S. PATENT DOCUMENTS

| | | | | |
|---|---|---|---|---|
| 2012/0320773 | A1* | 12/2012 | Toufik | H04B 17/382 370/252 |
| 2013/0201853 | A1* | 8/2013 | Perets | H04W 24/00 370/252 |
| 2014/0038587 | A1* | 2/2014 | Murgan | H04W 48/16 455/422.1 |
| 2015/0173009 | A1* | 6/2015 | Vallath | H04W 48/20 370/329 |
| 2016/0183272 | A1* | 6/2016 | Pu | H04B 17/318 370/252 |
| 2016/0234707 | A1* | 8/2016 | Kazmi | H04W 76/28 |
| 2017/0250786 | A1 | 8/2017 | Better et al. | |
| 2018/0220458 | A1* | 8/2018 | Ouchi | H04W 74/0808 |
| 2019/0162817 | A1* | 5/2019 | Priyanto | H04B 1/713 |
| 2019/0357234 | A1* | 11/2019 | Yang | H04L 1/0026 |
| 2020/0221522 | A1* | 7/2020 | Shimezawa | H04L 5/0051 |
| 2021/0266873 | A1* | 8/2021 | Jiang | H04W 72/042 |

FOREIGN PATENT DOCUMENTS

| | | |
|---|---|---|
| CN | 104303439 A | 1/2015 |
| CN | 107078890 A | 8/2017 |
| EP | 2066043 A1 | 3/2009 |
| WO | 2010031725 A1 | 3/2010 |
| WO | 2012095770 A1 | 7/2012 |
| WO | 2013180991 A1 | 12/2013 |
| WO | 2016125119 A1 | 8/2016 |
| WO | 2018104866 A1 | 6/2018 |

OTHER PUBLICATIONS

EPO Communication and European Search Report dated Apr. 6, 2021 for Patent Application No. 18863891.0, consisting of 24-pages.
3GPP TSG-RAN WG4 Meeting #84 R4-1708439; Title: Views on CRS muting for eMTC/FeMTC UEs; Agenda Item: 8.25.3.1; Source: Qualcomm Incorporated; Document for: Discussion; Date and Location: Aug. 21-25, 2017, Berlin, Germany, consisting of 4-pages.
3GPP TSG-RAN WG4 Meeting #84 R4-1709085; Title: VWF on CRS muting for eFeMTC RRM; Agenda Item: 8.25.3.1; Source: Huawei, HiSilicon, Ericsson; Date and Location: Aug. 21-25, 2017, Berlin, Germany, consisting of 4-pages.
3GPP TSG-RAN WG4 Meeting #84bis R4-1711168; Title: UE initial access for cat-M1/M2 under CRS muting; Agenda Item: 8.21.4.2; Source: Ericsson; Document for: Discussion; Date and Location: Oct. 9-13, 2017, Dubrovnik, Croatia, consisting of 5-pages.
3GPP TSG-RAN WG4 Meeting #85 R4-1713157; Title: Discussions on remaining issues on UE initial access under CRS muting; Agenda Item: 8.21.4.2; Source: Ericsson; Document for: Discussion; Date and Location: Nov. 27-Dec. 1, 2017, Reno, Nevada, US, consisting of 4-pages.
International Search Report and Written Opinion dated Feb. 8, 2019 for International Application No. PCT/SE2018/051005 filed on Oct. 1, 2018, consisting of 13-pages.
3GPP TSG RAN Meeting #76 RP-171408; Title: New LTE WI on UE requirements for network-based CRS mitigation; Source: Ericsson; Document for: Approval; Agenda Item: 10.1.4; Location and Date: West Palm Beach, USA, Jun. 5-8, 2017, consisting of 7-pages.
3GPP TSG-RAN WG4 #84 R4-1707780; Title: CRS muting impact on RRM requirements for MTC; Source: Ericsson; Agenda Item: 8.25.3.1; Document for: Discussion; Location and Date: Berlin, Germany, Aug. 21-25, 2017, consisting of 5-pages.
Chinese Office Action with English Summary Translation dated Jan. 12, 2022 for Patent Application No. 201880062925.5, consisting of 13-pages.

\* cited by examiner

METHOD FOR BAND SCANNING WHEN REFERENCE SIGNAL IS TRANSMITTED OVER REDUCED BANDWIDTH

This Application is a Submission Under 35 U.S.C. § 371 for U.S. National Stage Patent Application of International Application No.: PCT/SE2018/051005, filed Oct. 1, 2018 entitled "METHOD FOR BAND SCANNING WHEN REFERENCE SIGNAL IS TRANSMITTED OVER REDUCED BANDWIDTH," which claims priority to U.S. Provisional Application No. 62/566,632, filed Oct. 2, 2017, entitled "METHOD FOR BAND SCANNING WHEN REFERENCE SIGNAL IS TRANSMITTED OVER REDUCED BANDWIDTH," the entireties of both of which are incorporated herein by reference.

TECHNICAL FIELD

The present disclosure relates to wireless communications, and in particular, methods and apparatuses for band scanning when a reference signal is transmitted over a reduced bandwidth.

BACKGROUND

Some wireless communication network technologies make use of cell searching to support communications between the wireless device and the network node. Frequency searching is part of the overall cell search procedure. With that being said, some fundamental concepts related to frequency searching include channel raster and channel numbering, which influence the frequency search performance.

Channel Raster

In order to simplify the center of the carrier frequency search, or the so-called initial cell search, the center frequency of a radio channel is specified to be an integral multiple of a well-defined, generally fixed number, called a channel raster. The channel raster enables a wireless device (WD), such as a user equipment (UE) to tune its local oscillator only at one of the raster points assuming it to be the center frequency of the channel being searched. As an example, in Long-Term Evolution (LTE), the channel raster for all channels (i.e., all bandwidths) is 100 KHz.

Cell Search Procedure

In many technologies, such as, in Global System for Mobile Communication (GSM), Universal Terrestrial Radio Access (UTRA), Evolved Universal Terrestrial Radio Access (E-UTRA), and next generation radio access technology such as New Radio (NR) the WD searches cells in a hierarchical manner, sometimes referred to as a hierarchical cell search procedure. This means the WD typically acquires frequency synchronization, cell frame timing, and cell physical identity in tandem. These concepts are discussed in the following sections:

Frequency Search or Band Scanning

When the WD is powered on it first searches the list of all possible frequencies (or channels) in a frequency band. The goal is to find, within a particular frequency band, the most suitable frequency channels in use within a region. Initially, the WD typically searches for every possible carrier frequency within a frequency band, and estimates or detects the energy received over the carrier frequency within the WD bandwidth (or within the system bandwidth, depending on the frequency band). This is sometimes called an initial cell search, a band scanning, or a frequency scanning. If the detected energy level indicates that there is a downlink (DL) transmission, i.e., transmission from the network node to the WD, then the WD proceeds with the next step of cell search as described in the next section.

The complexity of the frequency search can increase proportionally with the increase in the number of frequency bands to scan and also the number of carriers within each band.

Cell Timing and Cell ID Acquisition

In this phase or step, the WD proceeds with the remaining tasks, or more specifically, acquires the cell timing and cell identification (ID) of neighboring cells, which are operating on the same frequency channel found during the frequency search. During the frequency searching, the WD generally also detects the timing of the strongest cell. But this may depend largely upon the specific algorithm used for the frequency search. For example, the WD typically performs correlation over the synchronization sequences while assuming a certain center frequency.

In any case, after acquiring frequency synchronization the WD continues performing the neighbor cell search. The WD therefore continuously attempts to find the cell timing and the physical ID of the cells operating on the acquired carrier frequency.

Reference Signal Muting

Since Rel-8 in LTE, the Cell-specific Reference Signals (CRSs) are transmitted by the base station using full system bandwidth and in all DL subframes in a radio frame. The CRS is used by the WD for several procedures. Examples of such procedures are time and/or frequency tracking or synchronization, channel estimation, radio link quality measurements, cell selection, cell reselection, etc.

However, the CRSs are not used by the WD all the time. The continuous CRS transmission with full system bandwidth in one cell may cause interference at the WD operating in a neighboring cell. The CRS transmission also consumes base station (BS) power. Accordingly, in one example, the CRS can be muted outside the minimum bandwidth (e.g., 1.4 MHz) in a cell during the inactive time (e.g., OFF duration) of the discontinuous reception (DRX) and the CRS can be transmitted over full bandwidth (BW) during the active time (e.g., ON duration) of the DRX cycle.

FIG. 1 illustrates one example of a CRS muting operation. The term "muted CRS" refers to the transmission of CRS using reduced CRS bandwidth (e.g., over central 6 resource blocks (RBs) within a cell bandwidth (BW)) during an inactive time of the DRX, excluding warm up and cool down periods. The warm up and cool down periods typically occur during the inactive time and during which the CRS is transmitted over full BW of the cell, or over a larger bandwidth, as shown, for example, in FIG. 1. As a special case, warmup and/or cool down periods can be zero. During at least the active time of the DRX, the CRS are transmitted over full bandwidth, or larger bandwidth, as compared to the reduced CRS bandwidth. This is also called lean carrier operation, reference signal (RS) muting, or CRS muting. The lean carrier operation is applied when the DRX and/or enhanced DRX (eDRX) cycle is used.

DRX Cycle Operation

In LTE, the DRX cycle is used to allow the WD to save battery power. The DRX cycle is used in the radio resource control (RRC) idle state, but it can also be used in an RRC connected state. Examples of lengths of time corresponding to the DRX cycles currently used in the RRC idle state include 320 millisecond (ms), 640 ms, 1.28 second (s), and 2.56 s. Examples of lengths of time corresponding to the DRX cycles currently used in the RRC connected state may range from 2 ms to 2.56 s. The eDRX cycles are expected to be very long (e.g., ranging from several seconds to several minutes and even up to one or more hours). Typical values of eDRX cycles may be between 4-10 minutes.

The DRX cycle is configured by the network node and can characterized by at least the following parameters:

On-duration: During the On-duration of the DRX cycle, a timer (referred to as an "onDurationTimer"), which is configured by the network node, is running. This timer specifies the number of consecutive control channel subframes (e.g., Physical Downlink Control Channel (PDCCH), or Enhanced Physical Downlink Control Channel (ePDCCH) subframe(s)) at the beginning of a DRX Cycle. It is also interchangeably referred to as a DRX ON period. More specifically, it is the duration in terms of the number of consecutive downlink subframes that the WD needs to decode, after waking up from DRX to receive control channel (e.g. PDCCH, ePDCCH). This requires the WD to turn on its receiver during at least the DRX ON duration of the DRX cycle. When the onDurationTimer is running the WD is considered to be in DRX state of the DRX cycle.

DRX-inactivity timer: If the WD successfully decodes the control channel (e.g., PDCCH, ePDCCH, Machine Type Physical Downlink Control Channel (MPDCCH), Narrowband Physical Downlink Control Channel (NPDCCH), etc.) during the On-duration, then the WD starts a DRX-inactivity timer (see below) and stays awake until it expires. The DRX-inactivity timer specifies the number of consecutive control channel (e.g., PDCCH, ePDCCH) subframe(s) after the subframe in which a control channel (e.g., PDCCH) indicates an initial uplink (UL) or downlink (DL) user data transmission for this MAC entity. It is also configured by the network node. When the DRX-inactivity timer is running the WD is considered to be in the non-DRX state, i.e., no DRX is used.

DRX active time: DRX-active time is the duration during which the WD monitors the control channel (e.g., PDCCH, ePDCCH, MPDCCH, NPDCCH etc.). In other words, this is the total duration during which the WD receiver is active or awake. This includes the "on-duration" of the DRX cycle, the time during which the WD is performing continuous reception while the DRX-inactivity timer has not expired, as well as the time the WD is performing continuous reception while waiting for a DL retransmission after one HARQ RTT. In contrast, during DRX inactive time the WD receiver is not active or awake and therefore the WD is not expected to monitor any control channel.

The DRX operation in LTE is illustrated in FIG. 2 with more detailed parameters. The embodiments of the present disclosure may also be applicable when the WD is configured with eDRX. The eDRX cycle has a DRX cycle length larger than a certain threshold (e.g., 5.12 seconds) and contains a paging transmission window (PTW) within each eDRX cycle. The PTW contains 1 or more DRX cycles.

The existing solutions described herein above have problems. In initial access, the WD typically has no prior information about the presence of the cell, which it tries to access, and is not aware of the center frequency of the synchronization signals (e.g., Primary synchronization signal/Secondary synchronization signal (PSS/SSS)) used for cell identification. In some deployment scenarios, (e.g., LTE) the center frequencies of the cell and of the synchronization signals are the same. However, in some other deployment scenarios, (e.g., NR) the center frequencies of the cell and of the synchronization signals (e.g., the synchronization signal block (SSB) in NR) may or may not be the same.

The first step for identifying the cell during initial access is to determine the presence of a carrier frequency over which the cell operates. This is referred to as frequency scanning, band scanning, frequency search, or initial cell search. The next step is to identify the cell operating on the determined carrier frequency by, for example, identifying the physical cell identification (PCI). This also includes the determination of the center frequency of the synchronization signals. In the band scanning procedure, the WD typically estimates the energy (Pe) over a certain frequency range in a certain time period and compare it with a certain energy threshold (Hg) to determine whether one or more cells may operate on a carrier frequency, F1, or in a certain carrier frequency range.

The band scanning procedure works fine in legacy systems where the reference signals (e.g., cell specific reference signals (CRSs)) are transmitted over the full cell bandwidth frequently in time resources (e.g., in every time resource, such as in every subframe (e.g., 1 ms in LTE)). However, the problem arises in future releases of LTE (e.g., Rel-15) or NR where cells employ lean carrier operation. In lean carrier operation, the reference signals can be muted or transmitted only within a certain part of the cell bandwidth, and also the WD RF bandwidth can be smaller than the cell bandwidth. This makes the legacy method of frequency scanning for initial access not suitable under this new scenario.

SUMMARY

Methods and apparatuses for communication between network nodes and wireless devices are disclosed herein and, in some embodiments, for facilitating band scanning in lean carrier operation.

According to one aspect of this disclosure, a method for a network node for lean carrier operation is provided. The method includes identifying at least one time period for transmitting a reference signal over a full cell bandwidth in lean carrier operation; and transmitting a reference signal according to a bandwidth pattern, the bandwidth pattern based at least in part on the identified at least one time period.

In some embodiments of this aspect, the method further includes identifying at least one time period for transmitting the reference signal over a reduced bandwidth for the lean carrier operation. In some embodiments of this aspect, the reduced bandwidth is smaller than the full cell bandwidth, in some embodiments of this aspect, the method further includes determining the bandwidth pattern based at least in part on the identified at least one time period for transmitting the reference signal over the full cell bandwidth. In some embodiments of this aspect, the method further includes determining the bandwidth pattern based at least in part on the identified at least one time period for transmitting the reference signal over the full cell bandwidth and the identified at least one time period for transmitting the reference signal over the reduced bandwidth. In some embodiments of this aspect, the transmitted reference signal comprises a cell-specific reference signal (CRS). In some embodiments of this aspect, the bandwidth pattern comprises a periodicity. In some embodiments of this aspect, the periodicity is 20 milliseconds (ms). In some embodiments of this aspect, the periodicity is 10 milliseconds. In some embodiments of this aspect, the periodicity is based at least in part on at least one of a random access (RA) procedure and a system information block (SIB) transmission duration. In some embodiments of this aspect, the at least one time period for transmitting the reference signal over the full cell bandwidth in lean carrier operation corresponds to 1 millisecond. In some embodiments of this aspect, the method further includes, as a result of the reference signal transmitted according to the bandwidth pattern, receiving an initial access request for a wireless device (WD).

According to another aspect of this disclosure, a network node for lean carrier operation is provided. The network node includes processing circuitry configured to cause the network node to identify at least one time period for transmitting a reference signal over a full cell bandwidth in lean carrier operation; and transmit a reference signal according to a bandwidth pattern, the bandwidth pattern based at least in part on the identified at least one time period.

In some embodiments of this aspect, the processing circuitry is further configured to cause the network node to identify at least one time period for transmitting the reference signal over a reduced bandwidth for the lean carrier operation. In some embodiments of this aspect, the reduced bandwidth is smaller than the full cell bandwidth. In some embodiments of this aspect, the processing circuitry is further configured to cause the network node to determine the bandwidth pattern based at least in part on the identified at least one time period for transmitting the reference signal over the full cell bandwidth. In some embodiments of this aspect, the processing circuitry is further configured to cause the network node to determine the bandwidth pattern based at least in part on the identified at least one time period for transmitting the reference signal over the full cell bandwidth and the identified at least one time period for transmitting the reference signal over the reduced bandwidth. In some embodiments of this aspect, the transmitted reference signal comprises a cell-specific reference signal. In some embodiments of this aspect, the bandwidth pattern comprises a periodicity. In some embodiments of this aspect, the periodicity is 20 milliseconds. In some embodiments of this aspect, the periodicity is 10 milliseconds. In some embodiments of this aspect, the periodicity is based at least in part on at least one of a random access procedure and a system information block transmission duration. In some embodiments of this aspect, the at least one time period for transmitting the reference signal over the full cell bandwidth in lean carrier operation corresponds to 1 millisecond. In some embodiments of this aspect, the processing circuitry is further configured to cause the network node to, as a result of the reference signal transmitted according to the bandwidth pattern, receive an initial access request for a wireless device.

According to yet another aspect, a method for a wireless device for lean carrier operation is provided. The method includes determining at least a first time period and a second time period, the second time period being different from the first time period; estimating at least one energy level within at least one carrier frequency according to the determined first time period and the second time period; determining whether at least one cell is operating over the carrier frequency based at least in part on the estimated at least one energy level; and performing a cell search on the carrier frequency based on determining whether the at least one cell is operating over the carrier frequency.

In some embodiments of this aspect, the second time period is less than the first time period. In some embodiments of this aspect, the estimating the at least one energy level within the at least one carrier frequency according to the determined first time period and the second time period further comprises estimating a first energy level over the first time period within the carrier frequency; and estimating at least one second energy level over at least one instance of the second time period within the carrier frequency. In some embodiments of this aspect, estimating the at least one second energy level further comprises estimating the at least one second energy level over successive instances of the second time period within the carrier frequency. In some embodiments of this aspect, the method further includes determining a relation between the estimated first energy level and the estimated at least one second energy level for determining whether the at least one cell is operating over the carrier frequency. In some embodiments of this aspect, the determining the relation between the estimated first energy level and the estimated at least one second energy level further comprises comparing the estimated at least one second energy level to the estimated first energy level for determining whether the at least one cell is operating over the carrier frequency. In some embodiments of this aspect, the method includes, if a difference between the estimated at least one second energy level and the estimated first energy level at least meets a predetermined condition, determining that the at least one cell is operating over the carrier frequency. In some embodiments of this aspect, the method includes, if a difference between the estimated at least one second energy level and the estimated first energy level does not at least meet a predetermined condition, determining that the at least one cell is not operating over the carrier frequency. In some embodiments of this aspect, the first time period and the second time period correspond to a bandwidth pattern, the bandwidth pattern based at least in part on a reference signal transmission over a full cell bandwidth in lean carrier operation.

In some embodiments of this aspect, the determined first time period corresponds to a periodicity for a reference signal transmission over a full cell bandwidth in lean carrier operation. In some embodiments of this aspect, the determined second time period corresponds to a duration for a reference signal transmission over a reduced bandwidth in lean carrier operation. In some embodiments of this aspect, the reduced bandwidth is smaller than the full cell bandwidth. In some embodiments of this aspect, the reference signal transmission is a cell-specific reference signal transmission by a network node. In some embodiments of this aspect, the periodicity of the reference signal transmission over the full cell bandwidth in lean carrier operation is 20 milliseconds. In some embodiments of this aspect, the periodicity of the reference signal transmission over the full cell bandwidth in lean carrier operation is 10 milliseconds. In some embodiments of this aspect, the duration for the reference signal transmission over the full cell bandwidth in lean carrier operation is 1 millisecond. In some embodiments of this aspect, at least one of the first time period and the second time period corresponds to one of a random access periodicity and a system information block periodicity. In some embodiments of this aspect, performing the cell search on the carrier frequency based on the determining whether the at least one cell is operating over the carrier frequency comprises, in response to determining that the at least one cell is operating over the carrier frequency, performing the cell search on the carrier frequency. In some embodiments of this aspect, each of the first time period and the second time period is a predetermined time period. In some embodiments of this aspect, the estimating the at least one energy level within the at least one carrier frequency according to the determined first time period and the second time period further comprises estimating a power spectral density over the first time period and estimating a PSD over the second time period, each of the first and second time periods corresponding to 1 millisecond.

According to another aspect of this disclosure, a wireless device for lean carrier operation is provided. The wireless device includes processing circuitry configured to cause the WD to determine at least a first time period and a second time period, the second time period being different from the first time period; estimate at least one energy level within at least one carrier frequency according to the determined first time period and the second time period; determine whether at least one cell is operating over the carrier frequency based at least in part on the estimated at least one energy level; and perform the cell search on the carrier frequency based on the determination of whether the at least one cell is operating over the carrier frequency.

In some embodiments of this aspect, the second time period is less than the first time period. In some embodiments of this aspect, the processing circuitry is configured to cause the WD to estimate the at least one energy level within the at least one carrier frequency according to the determined first time period and the second time period by being configured to cause the WD to estimate a first energy level over the first time period within the carrier frequency; and estimate at least one second energy level over at least one instance of the second time period within the carrier frequency. In some embodiments of this aspect, the processing circuitry is configured to cause the WD to estimate the at least one second energy level by being further configured to cause the WD to estimate the at least one second energy level over successive instances of the second time period within the carrier frequency. In some embodiments of this aspect, the processing circuitry is further configured to cause the WD to determine a relation between the estimated first energy level and the estimated at least one second energy level for determining whether the at least one cell is operating over the carrier frequency. In some embodiments of this aspect, the processing circuitry is configured to cause the WD to determine the relation between the estimated first energy level and the estimated at least one second energy level by being further configured to cause the WD to compare the estimated at least one second energy level to the estimated first energy level for determining whether the at least one cell is operating over the carrier frequency. In some embodiments of this aspect, the processing circuitry is configured to cause the WD to, if a difference between the estimated at least one second energy level and the estimated first energy level at least meets a predetermined condition, determine that the at least one cell is operating over the carrier frequency. In some embodiments of this aspect, the processing circuitry is configured to cause the WD to, if a difference between the estimated at least one second energy level and the estimated first energy level does not at least meet a predetermined condition, determine that the at least one cell is not operating over the carrier frequency. In some embodiments of this aspect, the first time period and the second time period correspond to a bandwidth pattern, the bandwidth pattern based at least in part on a reference signal transmission over a full cell bandwidth in lean carrier operation. In some embodiments of this aspect, the determined first time period corresponds to a periodicity for a reference signal transmission over a full cell bandwidth in lean carrier operation. In some embodiments of this aspect, the determined second time period corresponds to a duration for a reference signal transmission over a reduced bandwidth in lean carrier operation. In some embodiments of this aspect, the reduced bandwidth is smaller than the full cell bandwidth. In some embodiments of this aspect, the reference signal transmission is a cell-specific reference signal transmission by a network node. In some embodiments of this aspect, the periodicity of the reference signal transmission over the full cell bandwidth in lean carrier operation is 20 milliseconds. In some embodiments of this aspect, the periodicity of the reference signal transmission over the full cell bandwidth in lean carrier operation is 10 milliseconds. In some embodiments of this aspect, the duration for the reference signal transmission over the full cell bandwidth in lean carrier operation is 1 millisecond. In some embodiments of this aspect, at least one of the first time period and the second time period corresponds to one of a random access periodicity and a system information block periodicity. In some embodiments of this aspect, the processing circuitry is further configured to cause the WD to perform the cell search on the carrier frequency by being configured to, in response to determining that the at least one cell is operating over the carrier frequency, perform the cell search on the carrier frequency. in some embodiments of this aspect, each of the first time period and the second time period is a predetermined time period. In some embodiments of this aspect, the processing circuitry is configured to estimate the at least one energy level within the at least one carrier frequency according to the determined first time period and the second time period by being further configured to cause the WD to estimate a power spectral density over the first time period and estimate a PSD over the second time period, each of the first and second time periods corresponding to 1 millisecond.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
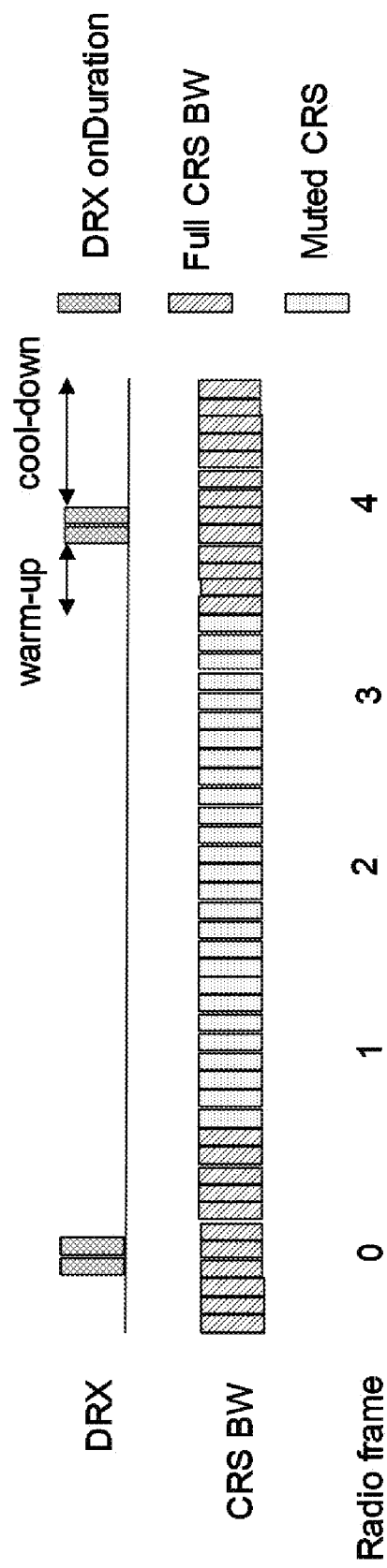
FIG. 1 is a diagram of an example operation with a network-based CRS mitigation.
Figure 2:
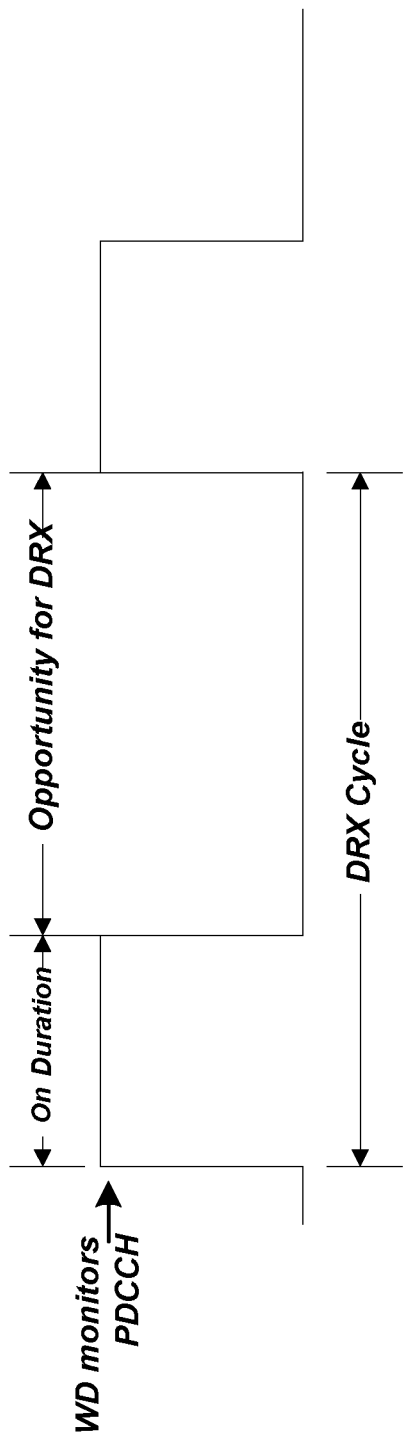
FIG. 2 is a diagram illustrating a DRX cycle operation in LTE according to one embodiment of the present disclosure.

Before describing in detail exemplary embodiments, it is noted that the embodiments reside primarily in combinations of apparatus components and processing steps related to band scanning when reference signals are transmitted over reduced bandwidth. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments a more general term "network node" is used and it can correspond to any type of radio network node or any network node, which communicates with a wireless device and/or with another network node. Examples of network nodes are NodeB, master eNB (MeNB), secondary eNB (SeNB), gNode B, a network node belonging to master cell group (MCG) or a secondary cell group (SCG), base station (BS), multi-standard radio (MSR) radio node such as a (multi-standard radio) MSR BS, eNodeB, network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), core network node (e.g. mobile switching center (MSC), mobile management entity (MME), etc.), operation and maintenance (O&M), operations support system (OSS), self-organizing network (SON), positioning node (e.g., evolved serving mobile location center (E-SMLC)), minimization of drive test (MDT) node, etc.

In some embodiments the non-limiting terms WD or wireless device are used interchangeably. The WD herein can be any type of wireless device capable of communicating with a network node or another WD over radio signals. The WD may also be a radio communication device, user equipment (UE), target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, radio network controller (RNC), evolved Node B (eNB), Node B, Multi-cell/multicast Coordination Entity (MCE), relay node, access point, radio access point, Remote Radio Unit (RRU), Remote Radio Head (RRH).

In some embodiments, the WD may be configured with primary cell (PCell) and primary secondary cell (PSCell) or with PCell, PSCell and one or more secondary cells (SCells) such as in dual connectivity and/or carrier aggregation. The configured cells may be WD specific, aka serving cells of the WD.

In some embodiments, the term "layer" is used and it may correspond to any carrier frequency on which one or more cells operate and can transmit and/or receive signals. The WD can perform one or more measurements on signals of one or more cells belong to the carrier frequency. The layer may also be referred to as a frequency layer, or a carrier frequency layer. Each carrier frequency may be addressed or indicated to the WD by an absolute channel number, which is sometimes referred to as ARFCN (e.g., Universal Mobile Telecommunications System (UMTS) absolute radio frequency channel number (UARFCN) in UMTS, evolved absolute radio frequency channel number (EARFCN) in LTE, etc.).

The term bandwidth (BW) used herein may be considered a range of frequencies over which a node transmits to and/or receives signal from another node. The BW is interchangeably referred to as operating bandwidth, channel bandwidth, system bandwidth, configured bandwidth, transmission bandwidth, cell bandwidth, cell transmission BW, and carrier bandwidth. The BW can be expressed in any one of the following: G1 MHz, G2 GHz, in in terms of a number of physical channels (e.g., G3 resource blocks, G4 subcarriers, etc.). In one example, the BW can include a guard band while in another example the BW can exclude the guard band. For example, system or channel BW can include a guard band, while transmission bandwidths may comprise of a BW without a guard band. For simplicity, term "BW" is used herein throughout to describe embodiments of the present disclosure.

The term "time resource" used herein may correspond to any type of physical resource or radio resource expressed in terms of length of time. Examples of time resources include, for example: symbol, time slot, subframe, radio frame, transmission time interval (TTI), interleaving time, etc. The term "TTI" used herein may correspond to any time period (T0) over which a physical channel can be encoded and optionally interleaved for transmission. The physical channel is decoded by the receiver over the same time period (T0) over which it was encoded. The TTI may also interchangeably be referred to as a short TTI (sTTI), transmission time, time slot, sub-slot, mini-slot, and mini-subframe.

The term reference signals (RS) used herein may correspond to any type of physical signal pre-configured in the WD such as, for example, a signal or associated sequence known to the WD. Examples of RS include, without limitation: CRS, DMRS, multi-broadcast single-frequency network (MBSFN) RS, channel state information reference signal (CSI-RS), PSS/SSS, narrowband reference signal (NRS), narrowband PSS (NPSS), narrowband SSS (NSSS), positioning reference signal (PRS), phase-tracking reference signal (PT-RS), and signals in SSB (e.g., NR PSS, NR SSS, NR PBCH DMRS, etc.).

The term "energy estimation" (or energy detection, energy measurement, or energy determination) used herein may correspond to estimation of energy or power of signals at the WD over a certain time and within a certain part of a frequency (e.g., bandwidth). The energy estimation may also be referred to herein as power estimation, Power spectral density (PSD) estimation, strength estimation, etc.

Some embodiments are applicable for a wireless device in a low or in a high activity state. Examples of low activity state include without limitation RRC idle state, idle mode, etc. Examples of high activity state include without limitation RRC CONNECTED state, active mode, active state, etc. The wireless device may be configured to operate in DRX or in non-DRX. If the wireless device is configured to operate in DRX, it may still operate according to non-DRX as long as it receives new transmissions from the network node.

Figure 3:
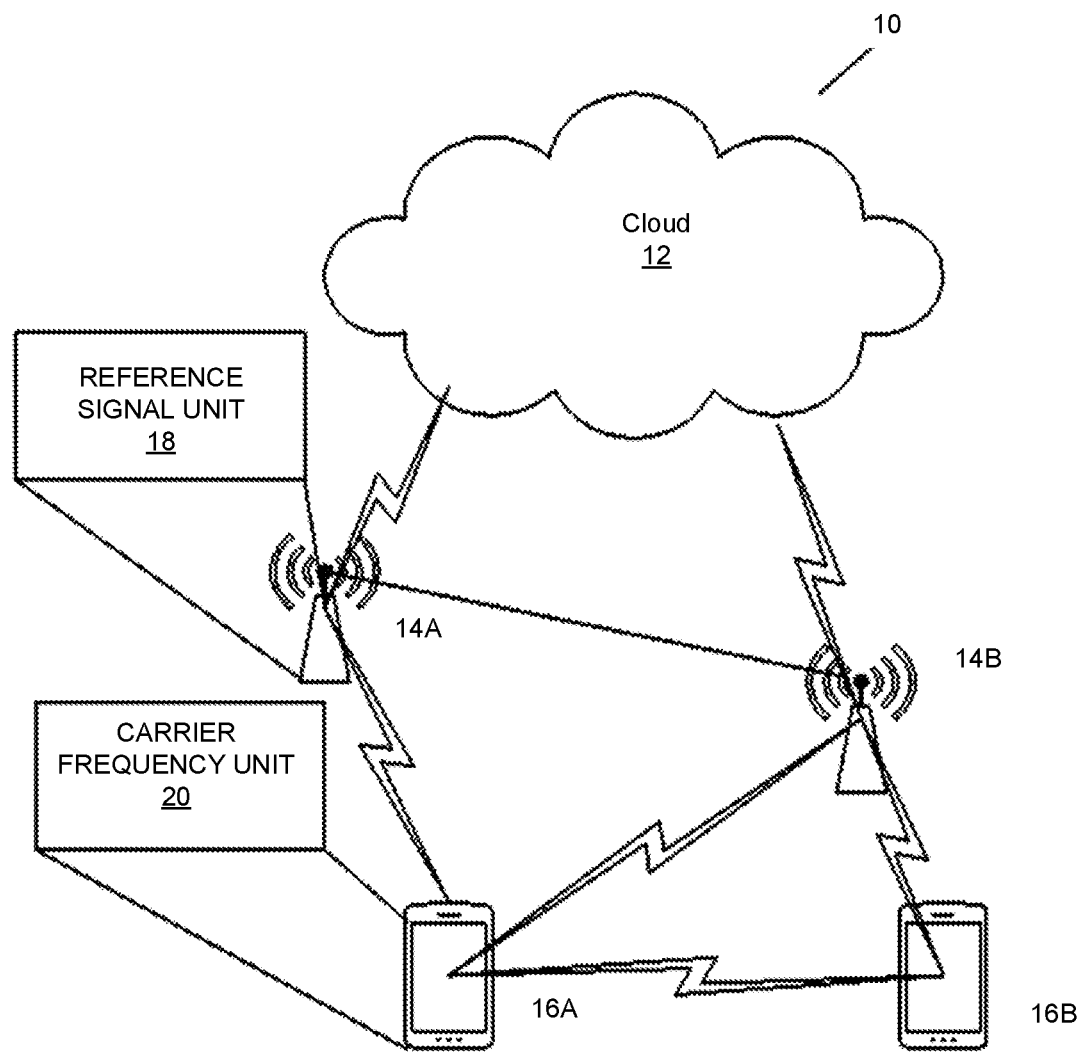
FIG. 3 is a block diagram of an exemplary network in accordance with one embodiment of the present disclosure.

Returning to the drawing figures, in which like elements are referred to by like reference designators, there is shown in FIG. 3 a block diagram of a wireless communication system 10 constructed according to principles set forth herein. The wireless communication network 10 includes a cloud 12 which may include the Internet and/or the public switched telephone network (PSTN). Cloud 12 may also serve as a backhaul network of the wireless communication network 10. The wireless communication network 10 includes one or more network nodes such as network nodes 14A and 14B, which may communicate directly via an X2 interface in LTE embodiments, and are referred to collectively as network nodes 14. It is contemplated that other interface types can be used for communication between network nodes 14 for other communication protocols such as New Radio (NR). The network nodes 14 may serve wireless devices 16A and 16B, referred to collectively herein as wireless devices 16. Note that, although only two wireless devices 16 and two network nodes 14 are shown for convenience, the wireless communication network 10 may typically include many more wireless devices (WDs) 16 and network nodes 14. Further, in some embodiments, WDs 16 may communicate directly using what is sometimes referred to as a side link connection.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

As shown in FIG. 3, the network node 14 includes a reference signal unit 18. In some embodiments, the reference signal unit 18 may be configured to determine a bandwidth pattern for transmitting a reference signal according to the bandwidth pattern, as described in more detail herein below. The wireless device 16 includes a carrier frequency unit 20. In some embodiments, the carrier frequency unit 20 is configured to determine one or more carrier frequencies so as to be able to perform a cell search on the one or more carrier frequencies, as described in more detail herein below. Various embodiments of the network nodes 14 and wireless device 16 are contemplated by embodiments of the present disclosure. Accordingly, alternative embodiments of the network nodes 14 and wireless devices 16 are illustrated in FIGS. 4-5 and FIGS. 6-7, respectively, which embodiments are discussed in more detail herein below.

Figure 4:
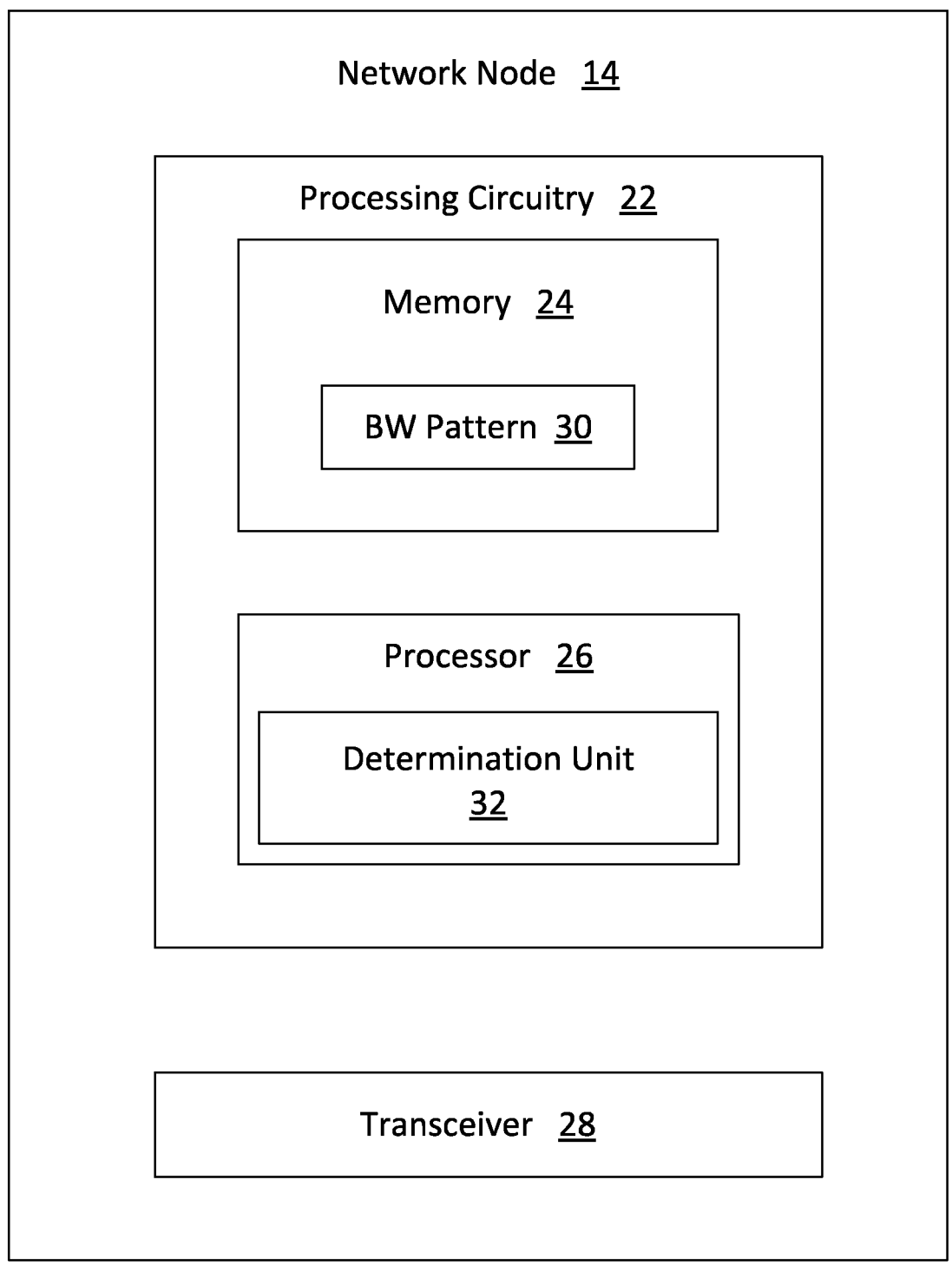
FIG. 4 is a block diagram of a network node according to one embodiment of the present disclosure.

FIG. 4 is a block diagram of an exemplary embodiment of the network node 14 configured to communicate with the wireless device 16. The network node 14 has processing circuitry 22. In some embodiments, the processing circuitry may include a memory 24 and processor 26, the memory 24 containing instructions which, when executed by the processor 26, configure processor 26 to perform the one or more functions described herein, including those relating to communicating with a wireless device. In addition to a traditional processor and memory, processing circuitry 22 may include integrated circuitry for processing and/or control, e.g., one or more processors and/or processor cores and/or FPGAs (Field Programmable Gate Array) and/or ASICs (Application Specific Integrated Circuitry).

Processing circuitry 22 may comprise and/or be connected to and/or be configured for accessing (e.g., writing to and/or reading from) memory 24, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may include a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible. The network node 14 also includes a transceiver 28 for transmitting and receiving signals between the network node 14 and the wireless device 16. In one embodiment, the memory 24 stores a BW pattern 30 and the processor 26 executes an algorithm of a determination unit 32 to implement the procedures described herein.

For example, in one embodiment, the processing circuitry 22 of the network node 14 may be configured to cause the network node 14 to identify at least one time period for transmitting a reference signal over a full cell bandwidth in lean carrier operation; and transmit, such as via transceiver 28, a reference signal according to a bandwidth pattern, the bandwidth pattern based at least in part on the identified at least one time period. In some embodiments, the processing circuitry 22 is further configured to cause the network node 14 to identify at least one time period for transmitting the reference signal over a reduced bandwidth for the lean carrier operation. In some embodiments, the reduced bandwidth is smaller than the full cell bandwidth, in some embodiments, the processing circuitry 22 is further configured to cause the network node 14 to determine the bandwidth pattern based at least in part on the identified at least one time period for transmitting the reference signal over the full cell bandwidth.

In some embodiments, the processing circuitry is further configured to cause the network node 14 to determine the bandwidth pattern based at least in part on the identified at least one time period for transmitting the reference signal over the full cell bandwidth and the identified at least one time period for transmitting the reference signal over the reduced bandwidth. In some embodiments, the transmitted reference signal comprises a cell-specific reference signal, CRS. In some embodiments, the bandwidth pattern comprises a periodicity. In some embodiments, the periodicity is 20 milliseconds, ms. In some embodiments, the periodicity is 10 milliseconds, ms. In some embodiments, the periodicity is based at least in part on at least one of a random access, RA, procedure and a system information block, SIB, transmission duration. In some embodiments, the at least one time period for transmitting the reference signal over the full cell bandwidth in lean carrier operation corresponds to 1 millisecond. In some embodiments, the processing circuitry 22 is further configured to cause the network node 14 to, as a result of the reference signal transmitted according to the bandwidth pattern, receive an initial access request for a wireless device, WD 16.

Figure 5:
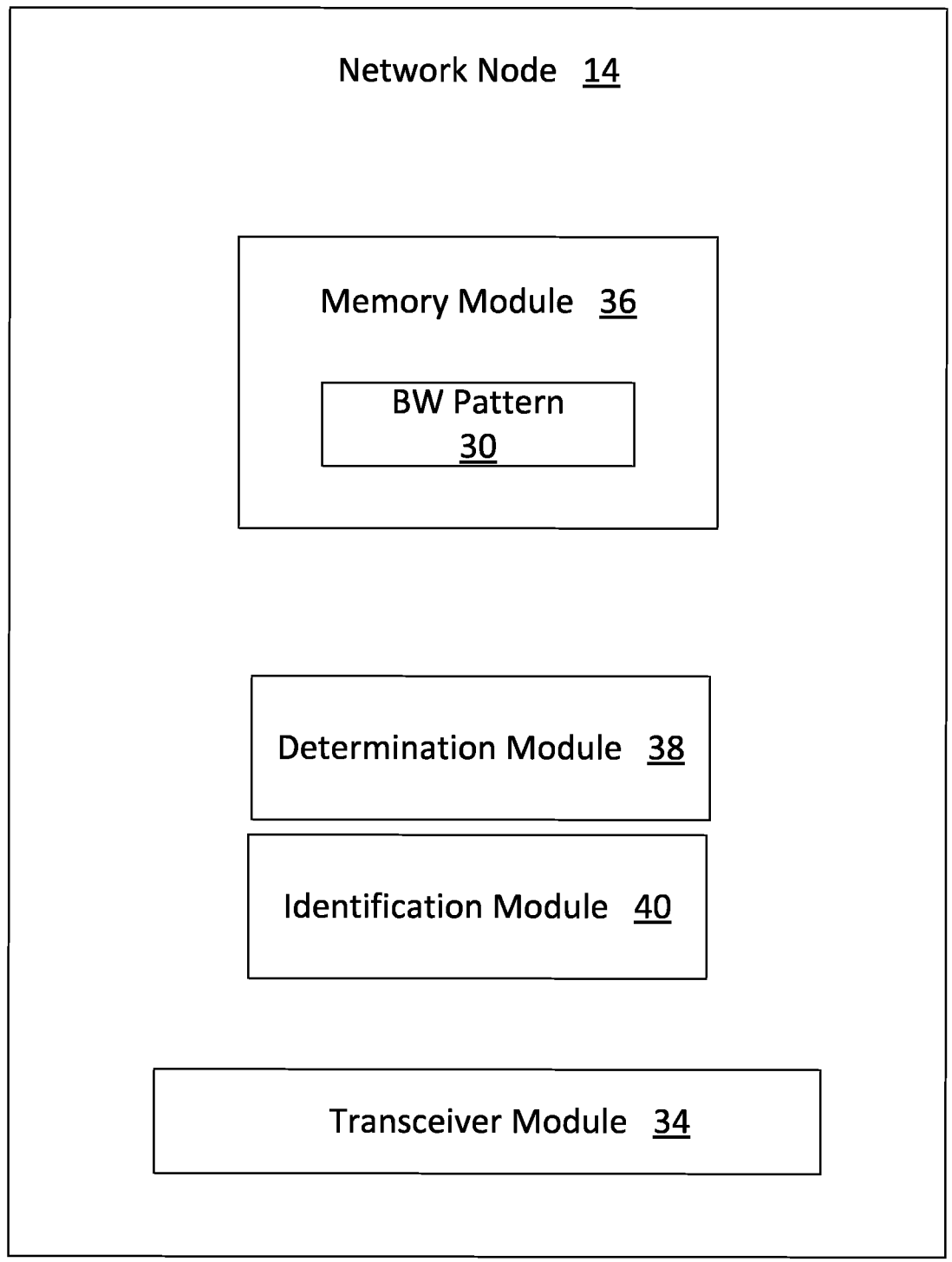
FIG. 5 is a block diagram of a network node according to an alternative embodiment of the present disclosure.

FIG. 5 is a block diagram of an alternative embodiment of the network node 14 having a transceiver module 34 and a memory module 36 storing the BW pattern 30 and also having a determination module 38 and an identification module 40 which may be software modules for executing the processes of the network node 14 described herein.

Figure 6:
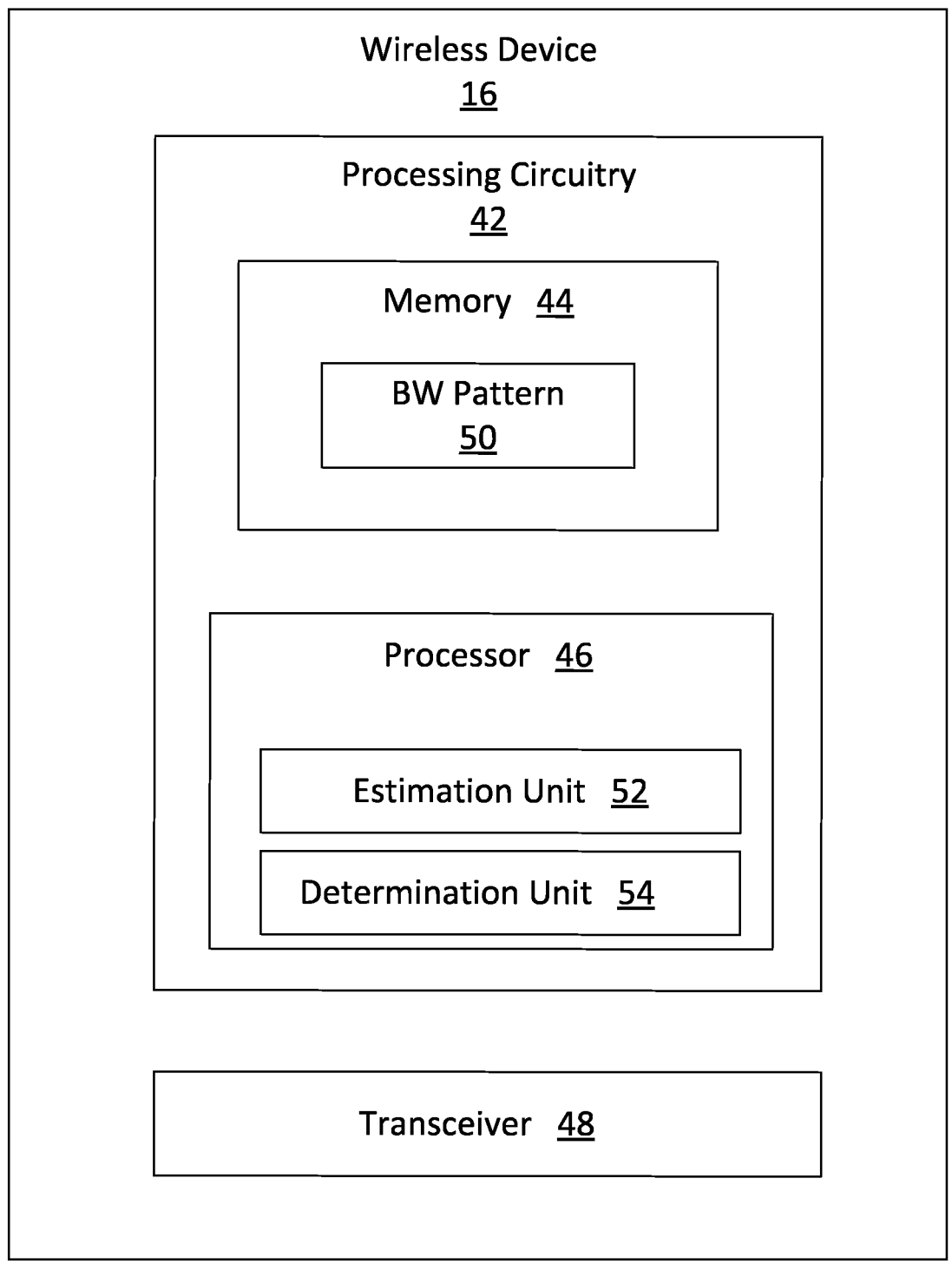
FIG. 6 is a block diagram of a wireless device according to one embodiment of the present disclosure.

FIG. 6 is a block diagram of an embodiment of an exemplary wireless device 16. The wireless device 16 includes processing circuitry 42 which includes a memory 44 and a processor 46. The wireless device 16 also includes a transceiver 48 for transmitting and receiving signals between the network node 14 and the wireless device 16. The memory 44 stores a BW pattern 50 and the processor 46 performs estimating procedures by the estimation unit 52 and determining procedures by the determination unit 54 as described herein for the wireless device 16. For example, in one embodiment for the wireless device 16, the processing circuitry 42 is configured to cause the WD 16 to determine at least a first time period and a second time period, the second time period being different from the first time period; estimate at least one energy level within at least one carrier frequency according to the determined first time period and the second time period; determine whether at least one cell is operating over the carrier frequency based at least in part on the estimated at least one energy level; and perform the cell search on the carrier frequency based on the determination of whether the at least one cell is operating over the carrier frequency.

In some embodiments, the second time period is less than the first time period. In some embodiments, the processing circuitry 42 is configured to cause the WD 16 to estimate the at least one energy level within the at least one carrier frequency according to the determined first time period and the second time period by being configured to cause the WD 16 to estimate a first energy level over the first time period within the carrier frequency; and estimate at least one second energy level over at least one instance of the second time period within the carrier frequency. In some embodiments, the processing circuitry 42 is configured to cause the WD 16 to estimate the at least one second energy level by being further configured to cause the WD 16 to estimate the at least one second energy level over successive instances of the second time period within the carrier frequency. In some embodiments, the processing circuitry 42 is further configured to cause the WD 16 to determine a relation between the estimated first energy level and the estimated at least one second energy level for determining whether the at least one cell is operating over the carrier frequency. In some embodiments, the processing circuitry 42 is configured to cause the WD 16 to determine the relation between the estimated first energy level and the estimated at least one second energy level by being further configured to cause the WD 16 to compare the estimated at least one second energy level to the estimated first energy level for determining whether the at least one cell is operating over the carrier frequency.

In some embodiments, the processing circuitry 42 is configured to cause the WD 16 to, if a difference between the estimated at least one second energy level and the estimated first energy level at least meets a predetermined condition, determine that the at least one cell is operating over the carrier frequency. In some embodiments, the processing circuitry 42 is configured to cause the WD 16 to, if a difference between the estimated at least one second energy level and the estimated first energy level does not at least meet a predetermined condition, determine that the at least one cell is not operating over the carrier frequency. In some embodiments, the first time period and the second time period correspond to a bandwidth pattern, the bandwidth pattern based at least in part on a reference signal transmission over a full cell bandwidth in lean carrier operation. In some embodiments, the determined first time period corresponds to a periodicity for a reference signal transmission over a full cell bandwidth in lean carrier operation. In some embodiments, the determined second time period corresponds to a duration for a reference signal transmission over a reduced bandwidth in lean carrier operation. In some embodiments, the reduced bandwidth is smaller than the full cell bandwidth. In some embodiments, the reference signal transmission is a cell-specific reference signal, CRS, transmission by a network node 14. In some embodiments, the periodicity of the reference signal transmission over the full cell bandwidth in lean carrier operation is 20 milliseconds, ms. In some embodiments, the periodicity of the reference signal transmission over the full cell bandwidth in lean carrier operation is 10 milliseconds, ms. In some embodiments, the duration for the reference signal transmission over the full cell bandwidth in lean carrier operation is 1 millisecond. In some embodiments, at least one of the first time period and the second time period corresponds to one of a random access, RA, periodicity and a system information block, SIB, periodicity. In some embodiments, the processing circuitry 42 is further configured to cause the WD 16 to perform the cell search on the carrier frequency by being configured to in response to determining that the at least one cell is operating over the carrier frequency, perform the cell search on the carrier frequency. In some embodiments, each of the first time period and the second time period is a predetermined time period. In some embodiments, the processing circuitry 42 is configured to estimate the at least one energy level within the at least one carrier frequency according to the determined first time period and the second time period by being further configured to cause the WD 16 to estimate a power spectral density, PSD, over the first time period and estimate a PSD over the second time period, each of the first and second time periods corresponding to 1 millisecond.

Figure 7:
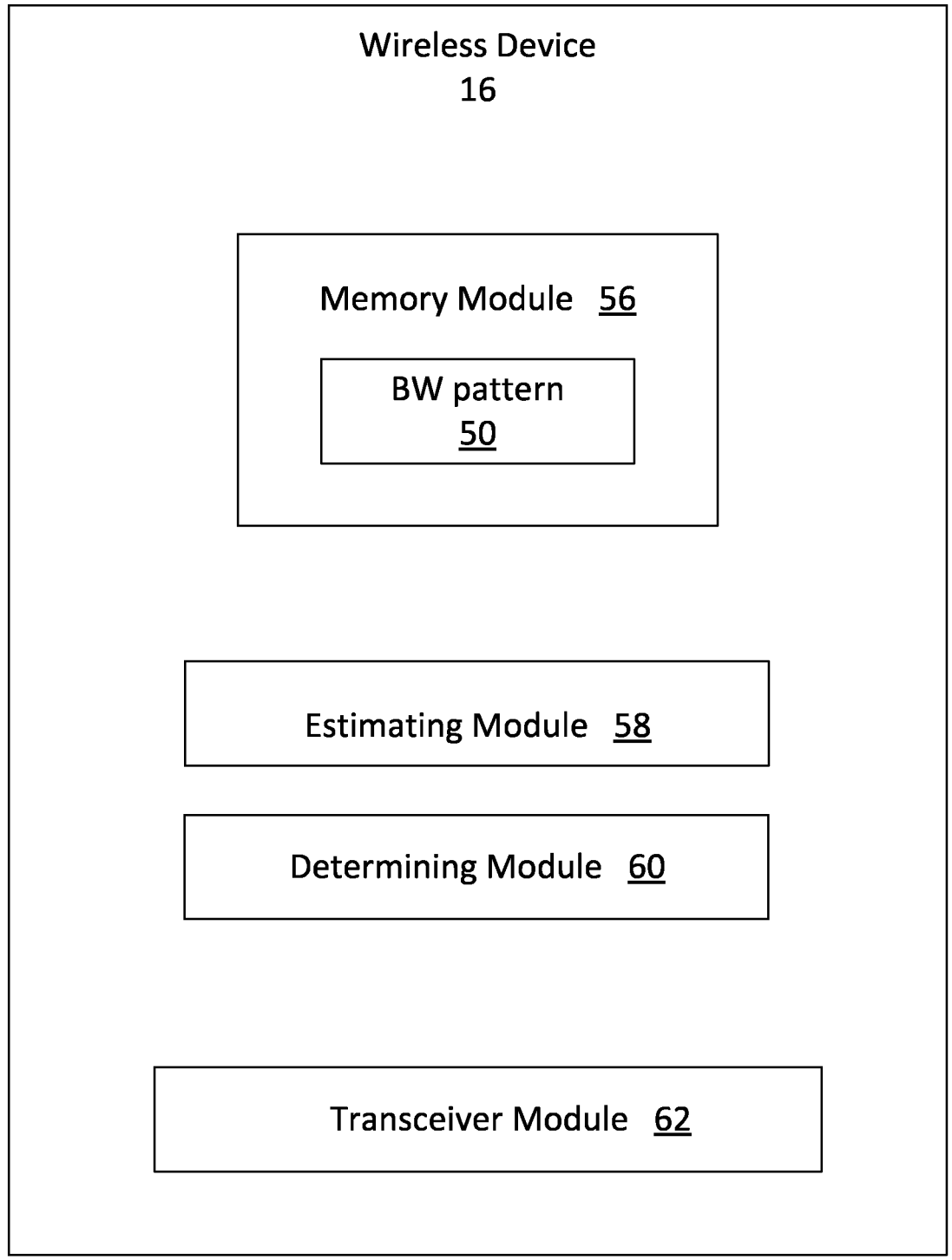
FIG. 7 is a block diagram of a wireless device according to an alternative embodiment of the present disclosure.

FIG. 7 is a block diagram of an alternative embodiment of the wireless device 16 which includes a memory module 56 that stores a BW pattern 50. The wireless device 16 also includes software modules 58 and 60 for performing estimating and determining procedures as described herein for the wireless device 16. The wireless device 16 also includes a transceiver module 62 for communicating with the network node 14 and other wireless devices.

Although FIGS. 3-7 may show various "units" that may be within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 8:
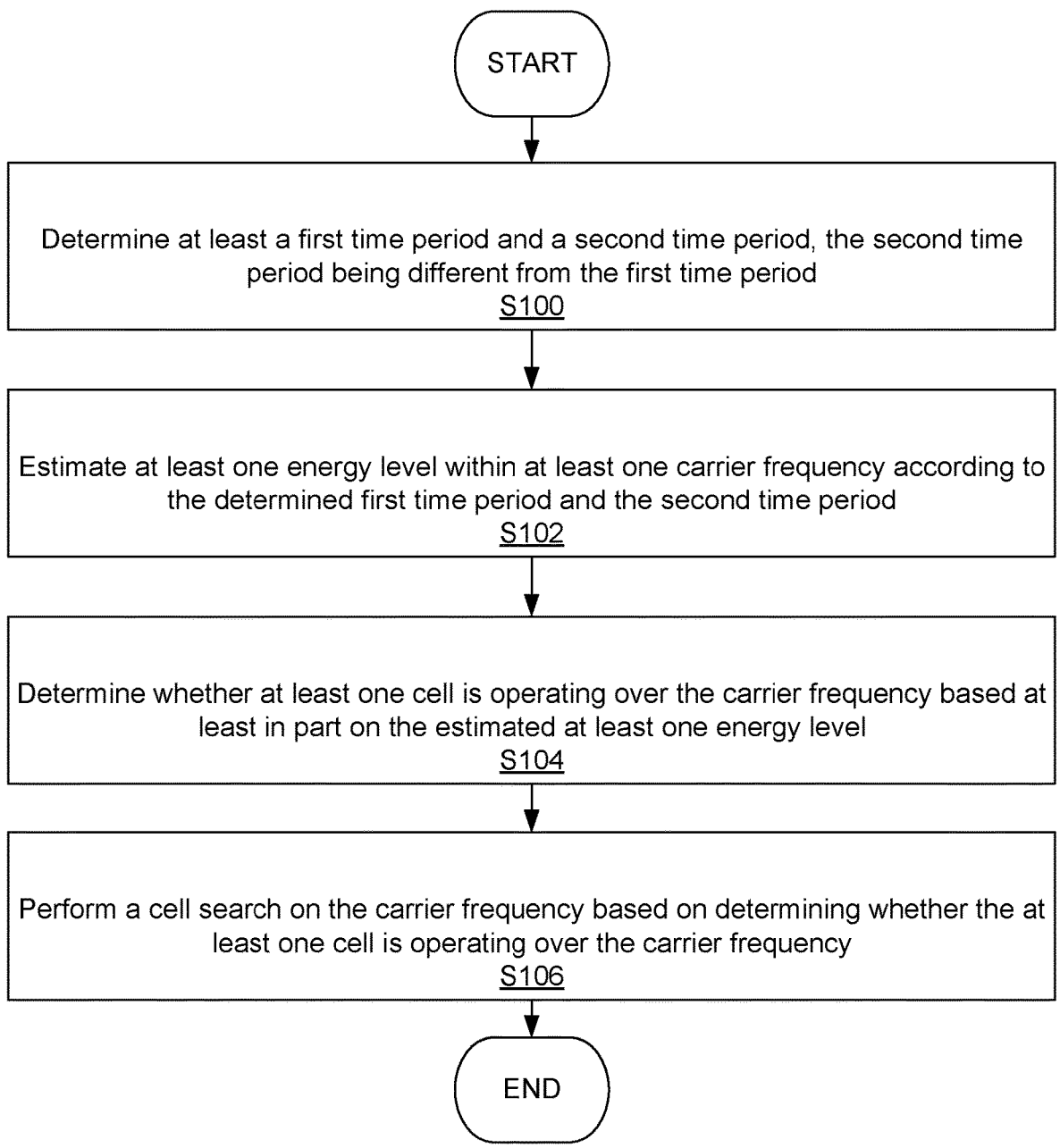
FIG. 8 is a flowchart of an exemplary process in a wireless device for attempting to communicate with a network node according to one embodiment of the present disclosure.

FIG. 8 is a flowchart of an exemplary process in a wireless device 16 for attempting to communicate with a network node 14. The process includes determining, such as via determination unit 54, at least a first time period and a second time period, the second time period being different from the first time period (block S100). The process includes estimating, such as via estimation unit 52, at least one energy level within at least one carrier frequency according to the determined first time period and the second time period (block S102). The process includes determining, such as via determination unit 54, whether at least one cell is operating over the carrier frequency based at least in part on the estimated at least one energy level (block S104). The process includes performing, such as via determination unit 54, a cell search on the carrier frequency based on determining whether the at least one cell is operating over the carrier frequency (block S106).

In some embodiments for the example process of the wireless device 16, the second time period is less than the first time period. In some embodiments, the estimating the at least one energy level within the at least one carrier frequency according to the determined first time period and the second time period further comprises estimating a first energy level over the first time period witn the carrier frequency: and estimating at least one second energy level over at least one instance of the second time period within the carrier frequency. In some embodiments, estimating the at least one second energy level further comprises estimating the at least one second energy level over successive instances of the second time period within the carrier frequency. In some embodiments, the process further includes determining a relation between the estimated first energy level and the estimated at least one second energy level for determining whether the at least one cell is operating over the carrier frequency. In some embodiments, the determining the relation between the estimated first energy level and the estimated at least one second energy level further comprises comparing the estimated at least one second energy level to the estimated first energy level for determining whether the at least one cell is operating over the carrier frequency. In some embodiments, the process includes, if a difference between the estimated at least one second energy level and the estimated first energy level at least meets a predetermined condition, determining that the at least one cell is operating over the carrier frequency. In some embodiments, the process includes, if a difference between the estimated at least one second energy level and the estimated first energy level does not at least meet a predetermined condition, determining that the at least one cell is not operating over the carrier frequency. In some embodiments, the first time period and the second time period correspond to a bandwidth pattern, the bandwidth pattern based at least in part on a reference signal transmission over a full cell bandwidth in lean carrier operation. In some embodiments, the determined first time period corresponds to a periodicity for a reference signal transmission over a full cell bandwidth in lean carrier operation. In some embodiments, the determined second time period corresponds to a duration for a reference signal transmission over a reduced bandwidth in lean carrier operation. In some embodiments, the reduced bandwidth is smaller than the full cell bandwidth.

In some embodiments, the reference signal transmission is a cell-specific reference signal, CRS, transmission by a network node 14. In some embodiments, the periodicity of the reference signal transmission over the full cell bandwidth in lean carrier operation is 20 milliseconds, ms. In some embodiments, the periodicity of the reference signal transmission over the full cell bandwidth in lean carrier operation is 10 milliseconds, ms. In some embodiments, the duration for the reference signal transmission over the full cell bandwidth in lean carrier operation is 1 millisecond. In some embodiments, at least one of the first time period and the second time period corresponds to one of a random access, RA, periodicity and a system information block, SIB, periodicity. In some embodiments, performing the cell search on the carrier frequency based on the determining whether the at least one cell is operating over the carrier frequency comprises in response to determining that the at least one cell is operating over the carrier frequency, performing the cell search on the carrier frequency. In some embodiments, each of the first time period and the second time period is a predetermined time period. In some embodiments, the estimating the at least one energy level within the at least one carrier frequency according to the determined first time period and the second time period further comprises estimating a power spectral density, PSD, over the first time period and estimating a PSD over the second time period, each of the first and second time periods corresponding to 1 millisecond.

In an alternative process in a wireless device 16, the process includes determining a first time period and a second time period. The process also includes estimating a first energy level over the first time period. The process may further include estimating at least one second energy level over the second time period. The process may also include determining a relation between the estimated first energy level and the estimated at least one second energy level.

In yet another alternative process in a wireless device 16 for attempting to communicate with a network node 14, the process includes determining a first time period and a second time period. The process also includes estimating a PSD of a frequency band one or more instances of the second time period during the first time period. The process also includes determining a carrier frequency in the frequency band by comparing an expected BW pattern to a measured BW pattern.

Figure 9:
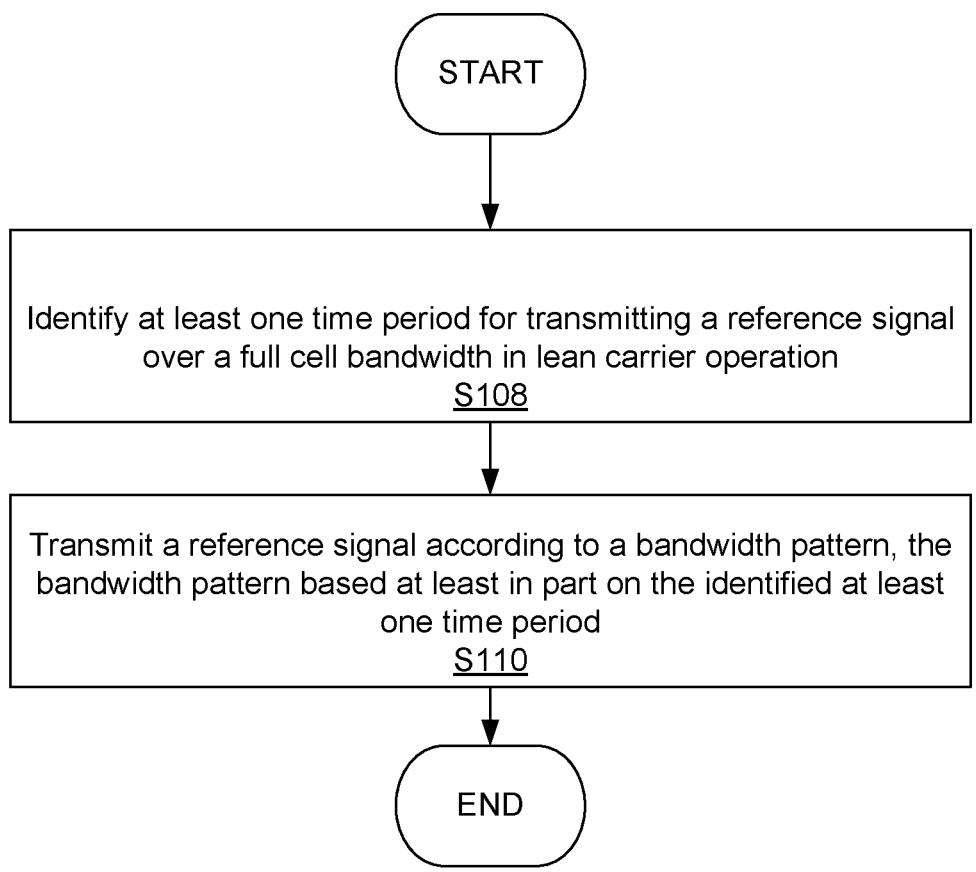
FIG. 9 is a flow chart of yet another exemplary process in a network node for attempting to communicate with a wireless device according to yet another embodiment of the present disclosure.

FIG. 9 is a flowchart of an exemplary process in a network node 14 configured for lean carrier mode operation. The process includes identifying, such as via reference signal unit 18, at least one time period for transmitting a reference signal over a full cell bandwidth in lean carrier operation (block S108). The process includes transmitting, such as via transceiver 28, a reference signal according to a bandwidth pattern, the bandwidth pattern based at least in part on the identified at least one time period (block S110).

In some embodiments of the example process in the network node 14, the process further includes identifying at least one time period for transmitting the reference signal over a reduced bandwidth for the lean carrier operation. In some embodiments, the reduced bandwidth is smaller than the full cell bandwidth. In some embodiments, the process further includes determining the bandwidth pattern based at least in part on the identified at least one time period for transmitting the reference signal over the full cell bandwidth. In some embodiments, the process further includes determining the bandwidth pattern based at least in part on the identified at least one time period for transmitting the reference signal over the full cell bandwidth and the identified at least one time period for transmitting the reference signal over the reduced bandwidth. In some embodiments, the transmitted reference signal comprises a cell-specific reference signal, CRS. In some embodiments, the bandwidth pattern comprises a periodicity. In some embodiments, the periodicity is 20 milliseconds, ms. In some embodiments, the periodicity is 10 milliseconds, ms. In some embodiments, the periodicity is based at least in part on at least one of a random access, RA, procedure and a system information block, SIB, transmission duration. In some embodiments, the at least one time period for transmitting the reference signal over the full cell bandwidth in lean carrier operation corresponds to 1 millisecond. In some embodiments, the process further includes, as a result of the reference signal transmitted according to the bandwidth pattern, receiving an initial access request for a wireless device, WD.

In some embodiments, the process further includes determining the bandwidth pattern based at least in part on the identified at least one time period for transmitting the reference signal over the full cell bandwidth and the identified at least one time period for transmitting the reference signal over the reduced bandwidth. In some embodiments, the transmitted reference signal comprises a cell-specific reference signal, CRS. In some embodiments, the bandwidth pattern comprises a periodicity. In some embodiments, the periodicity is 20 milliseconds, ms. In some embodiments, the periodicity is 10 milliseconds, ms. In some embodiments, the periodicity is based at least in part on at least one of a random access. RA, procedure and a system information block, SIB, transmission duration. In some embodiments, the at least one time period for transmitting the reference signal over the full cell bandwidth in lean carrier operation corresponds to 1 millisecond. In some embodiments, the process further includes, as a result of the reference signal transmitted according to the bandwidth pattern, receiving an initial access request for a wireless device, WD 16.

In an alternative embodiment in a network node 14, the process includes identifying one or more time periods for transmitting a reference signal over a full bandwidth. The process further includes determining the bandwidth pattern based on the identifying the one or more time periods and transmitting a reference signal according to the bandwidth pattern.

The following is a brief summary of embodiments of the present disclosure. One first scenario may comprise a wireless device (WD) 16 which performs an initial access to a first cell 1 (cell1) trying to enter the network without any prior knowledge of time-frequency resources over which cell1 operates. The cell1 operates on a carrier frequency (F1) and is served by a first network node 14 employing a lean carrier operation. In the lean carrier operational mode a cell transmits reference signals (RS) (e.g., CRS) over a full cell bandwidth (Bc) during a first time period (Ta) while over reduced bandwidth (Br) during a second time period (Tb), where following the condition is assumed Br<Bc. In the exemplary embodiment, during Tb there is no or low wireless device 16 activity (e.g., WDs do not receive data). During Ta there is higher wireless device 16 activity or higher wireless device 16 activity is expected (e.g., wireless device 16 may read a control channel, receive data, etc.). Examples of Ta and Tb are DRX active time (e.g., DRX ON duration) and DRX inactive time (e.g., DRX OFF duration) respectively. The time periods (Ta, Tb) can occur periodically or aperiodically in some embodiments.

According to a first embodiment, cell1 in lean carrier operational mode, transmits the RS over full bandwidth (Bc) over at least time period, Ts (e.g., over Nc number of time resources) with a certain periodicity (Tc) regardless of the values of the lean carrier-related operational parameters, e.g., Ta and Tb. In some embodiments, the parameters Ts and Tc can be, for example: pre-defined or predetermined at the wireless device 16 and/or network node 14; can be configured in cell 1 by a network node 14 (e.g., a core network node, another radio network node, etc.); and/or can be configured based on a request or a recommendation received from one or more WDs 16. The value of Tc and/or Ts can further be associated with an occurrence of a particular signal, operation, procedure, and/or the like. The value of Tc and/or Ts can, in some embodiments, further be associated with the DRX cycle configuration used in cell 1. The purpose of the periodic "light up" of the RS in cell1 in lean carrier operation is to assist the wireless device 16 to perform an initial cell search, e.g., band scanning. As an example, Tc can be associated with a periodicity of a random access transmission opportunity in cell1, e.g., Tc can be equal to the longest periodicity of the occurrence of the RA opportunity (e.g., 20 ms).

According to a second embodiment, the wireless device 16 may obtain information about the parameters Tc and Nc and use them to perform energy detection as part of the band scanning procedure as follows:

estimate a first energy level (P1) over a time period, T1 (e.g., T1=Tc=20 ms) and estimate a set of second energy levels (P2$i$, i=1,2, ... ) over K number of successive time periods, T2, within T1 (e.g., T2=Ts=2 ms), where K=T1/T2, i≤K.

Figure 10:
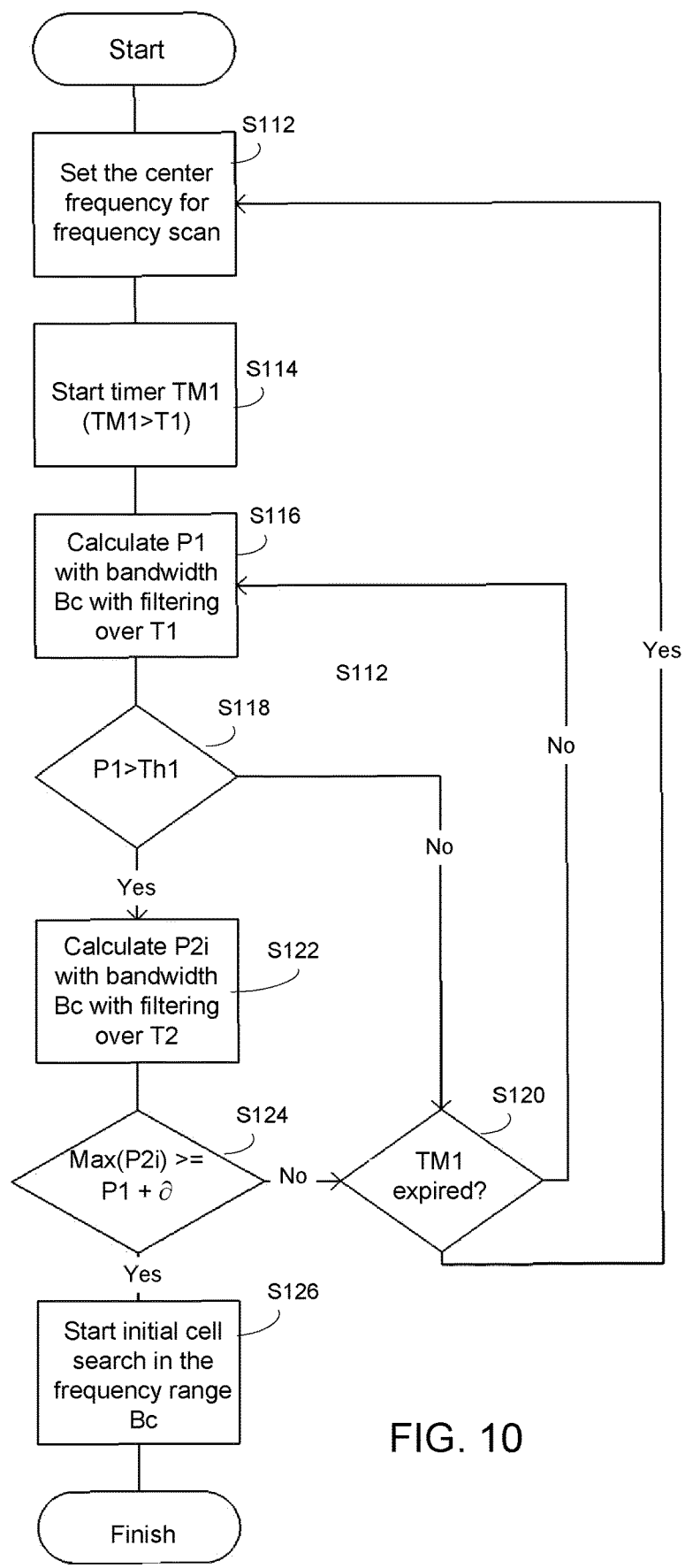
FIG. 10 is a flow chart illustrating an exemplary procedure for a WD attempting to access a network node according to one embodiment of the present disclosure.

FIG. 10 shows an exemplary flow chart of procedures that may be involved in this embodiment. P1 and P2$i$ may be estimated by using a function. Examples of functions include without limitation mean, weighted average, x-th percentile, median, and the like. As an example P1 and P2$i$ may be average values estimated over their estimated time periods, T1 and T2 respectively. Examples of energy levels estimated by the wireless device 16 may include without limitation: received signal strength indication (RSSI), received power including noise, etc. According to an example implementation illustrated in FIG. 10, an example process may include, e.g., the WD 16, setting the center frequency for the frequency scan in block S112 and starting timer TM1 in block S114. The process may include, when the timer TM1 is greater than (or equal to) the time period T1, calculating P1 with bandwidth Bc with filtering over T1 in block S116. The process includes determining whether P1 is greater than (or equal to) a threshold value, Th1, in block S118. If it is not (no), the process proceeds to block S120 where the WD 16 determines whether TM1 is expired and if TM1 is expired, the process returns to block S112, otherwise the process returns to block S116. On the other hand, if P1 is greater than (or equal to) the threshold value Th1 (yes), the process proceeds to block S122, where the WD 16 may calculate P2$i$ with bandwidth Bc with filtering over time period T2.

Having estimated the energy levels, the wireless device 16 may then compare P1 and P2$i$ to determine whether the presence of any carrier is detected or not by the wireless device 16, as in in block S124. For example, as shown in FIG. 10, if MAX (P2$i$)≥(P1+∂) then the wireless device 16 assumes that the frequency (F1) operating one or more cells has been detected. Otherwise, the wireless device 16 may assume that F1 operating one or more cells has NOT been detected and may proceed to block S120. The parameter ∂ can be a fixed or a configurable parameter. If F1 is detected, the wireless device 16 may proceed with a cell search procedure (e.g., to detect the primary synchronization signal (PSS) and/or secondary synchronization signal (SSS)) in block S126.

Put another way, if the condition MAX (P2$i$)≥(P1+∂) is met, this can be considered an indication that the wireless device 16 has detected some signals (e.g., reference/pilot signals such as CRS) in the tuned RF bandwidth. Thus, it can initiate a finer search for synchronization signals, such as, for example, the wireless device 16 actively starting the detection of the PSS and SSS. The main difference between the energy detection operation in the previous step and the subsequent more detailed finer search is that the latter is significantly more power consuming and thus should only be performed when the wireless device 16 has at least detected the presence of the carrier operating the cell (e.g., cell1).

According to yet another embodiment, in case the frequency scanning is provided by narrowband filtering or multiple executions of Fast Fourier Transforms (FFTs) covering the full band, in order to estimate what the most probable carrier frequency is a snapshot of the power spectrum density (PSD) may be estimated.

The PSD may vary according to the description above over time since the CRSs and traffic vary over time depending on Ta, Tb and other possible downlink (DL) transmissions. Now, the power levels P1 and P2$i$ can be estimated for any possible carrier frequency within the frequency band based on the PSD calculated over the full band. For example, the filtered power P1 can be estimated by taking the average of the power levels during the period over P1 and over the target bandwidth, while the P2$i$ levels may be the levels calculated for each FFT calculation averaged over its target bandwidth. With this PSD the bandwidth of the received signal can alternatively be used for detecting the cell. The CRS is continuously transmitted in the center resource blocks (RBs) and it is turned on and off outside the center RBs.

With this embodiment solution, the carrier frequency can be estimated by determining, for example, where the central RBs can be found (e.g., by estimating what part of the spectrum carrying RBs always includes power). Thereby, this exemplary estimation does not need to be performed for each EARFCN. Instead, the detection algorithm can search for periods where there are always transmissions, as described herein.

Advantages of the proposed solutions discussed herein may include without limitation one or more of the following:
  enabling detection of new cells during initial access with more power efficiency and more quickly, even if CRS muting/lean carrier is employed in the target cell;
  enabling faster and more power-efficient detection of a target cell during initial access when the synchronization signals and the center frequency are different;
  ensuring that the wireless device 16 does not miss the detection of strong cells; and/or
  improving the wireless device 16 coverage by enabling the wireless device 16 to detect the strong cells, resulting in the wireless device 16 being served by or camped on the strongest cell.

Having summarized various embodiments of the present disclosure along with some of that advantages contemplated by such solutions, a more detailed description of the various embodiments will now be described.

In one exemplary embodiment, a method is provided in a wireless device 16 being served by a network node 14, the method including obtaining information related to DRX alignment between cells and adapting its measurement procedure. According to one aspect of an embodiment, a method in a wireless device 16 attempting to access a cell comprises at least one or more of the following steps:

Step 1: Obtain information about a first time period (T1) and a second time period (T2), for example, based on pre-defined rule.

Step 2: Estimate a first received energy (P1) over the first time period, T1 (e.g., T1 is 20 ms) and within a carrier frequency F1.

Step 3: Estimate at least one second energy level or a set of second energy levels (P2$i$) over K number of successive second time periods, T2 (e.g., T2 is 2 ms) and within F1, where T2<T1.

Step 4: Determine a relation between at least estimated energy level P1 and estimated energy level(s) P2$i$ in the previous steps.

Step 5: Based on the determined relation, determine whether or not one or more cells are operating over F1.

The above steps are described herein below in more detail.

Step 1

In this step, the wireless device 16 obtains parameters which are related to energy detection as part of the band scanning procedure. Examples of such parameters are a first time period (T1) and a second time period (T2). The wireless device 16 can obtain these parameters based on any of, for example: a pre-defined information, wireless device 16 autonomous determination, and/or information received by the wireless device 16 from the network node 14 (e.g., provided to the wireless device 16 when the wireless device 16 was previously camped on a cell). The parameter T1 corresponds to a periodicity with which RSs are transmitted over full bandwidth over T2. For example, if RS is transmitted over 1 subframe at least once every 20 ms then T1=20 ms and T2=1 ms.

Step 2

In this step, a first energy level may be estimated over a first time period (e.g., T1) within a carrier frequency. The wireless device 16 may not be connected or camped to any cell, nor does the wireless device 16 have any prior knowledge about the cell it tries to access. This procedure is also known as initial access, initial cell search, band scanning, frequency scanning, etc. This procedure may take place when the wireless device 16 has, for example, lost its serving cell, or when the wireless device 16 switches ON the device.

Typically, the wireless device 16 is configured with different bands that the operator and the device supports, and the bands may have different priorities according to which the wireless device 16 scans in order to detect cells.

The wireless device 16 may estimate the received energy over the complete/full frequency band in order to detect where a cell can be detected by any one or more of the following means, such as, for example, estimating the energy over a certain time period within a radio frequency (RF) filter tuned over a certain carrier frequency.

The energy estimation or energy detection may be performed by the wireless device 16 over T1 within a certain bandwidth of the searched frequency band. Typically, with the time filtering the bandwidth (BW) is equal to the WD RF BW supported by the wireless device 16. The supported WD receiver bandwidth varies with the type of WD (e.g., WD category type). A category M1 WD is able to receive signals over a bandwidth of least 1.4 MHz and a WD of category M2 is able to receive signals over a bandwidth of least 5 MHz.

In one example, T1 can be a pre-defined or predetermined value (e.g., 20 ms). In another example, T1 can be associated with a periodicity with which certain types of signals can be transmitted in a cell in uplink and/or in downlink. For example, before the start of the transmission of a specific signal in the cell, or during the transmission of such signal the cell transmits RS over full BW. This is explained with a few specific examples below.

In one specific example, T1 can be associated with or be a function of the periodicity of the random access (RA) opportunity in the network, e.g., the longest possible periodicity of the RA opportunity such (e.g., 20 ms). For example, a cell transmits RS over full BW over 2 ms just before the start of the longest possible RA transmission in that cell. This enables the wireless device 16 to know that in any time period of 20 ms, there is at least one duration of 2 ms over which RS is transmitted over the full BW in the cell.

In yet another example, T1 can be associated with or be a function of a certain system information block (SIB) transmission periodicity (e.g., T1=80 ms). Examples of SIB include without limitation SIB1, SIB1-BR, SIB1-NR, SIB2, and the like. For example, every 10 ms the cell transmits RS over full BW over at least 2 ms just before the start of the SIB1 transmission. The cell may also transmit RS over full BW during an SIB1 transmission and also may transmit RS over full BW in at least one subframe immediately after the SIB1 transmission.

The estimation may result in a power spectrum density (PSD), or RSSI, which may provide an indication about the strength of the estimated signal. The estimated energy over period T1 is denoted P1 herein, and may correspond to the maximum energy detected during T1.

In some embodiments, the WD may use different functions for estimating the strength of the detected energy. Examples of such functions include without limitation mean, weighted average, x-th percentile, median, etc. As an example, P1 and a set of P2$i$ are average values estimated over their estimated time periods, T1 and T2 respectively. Examples of energy levels include without limitation an RSSI, received power including noise, and the like.

Figure 11:
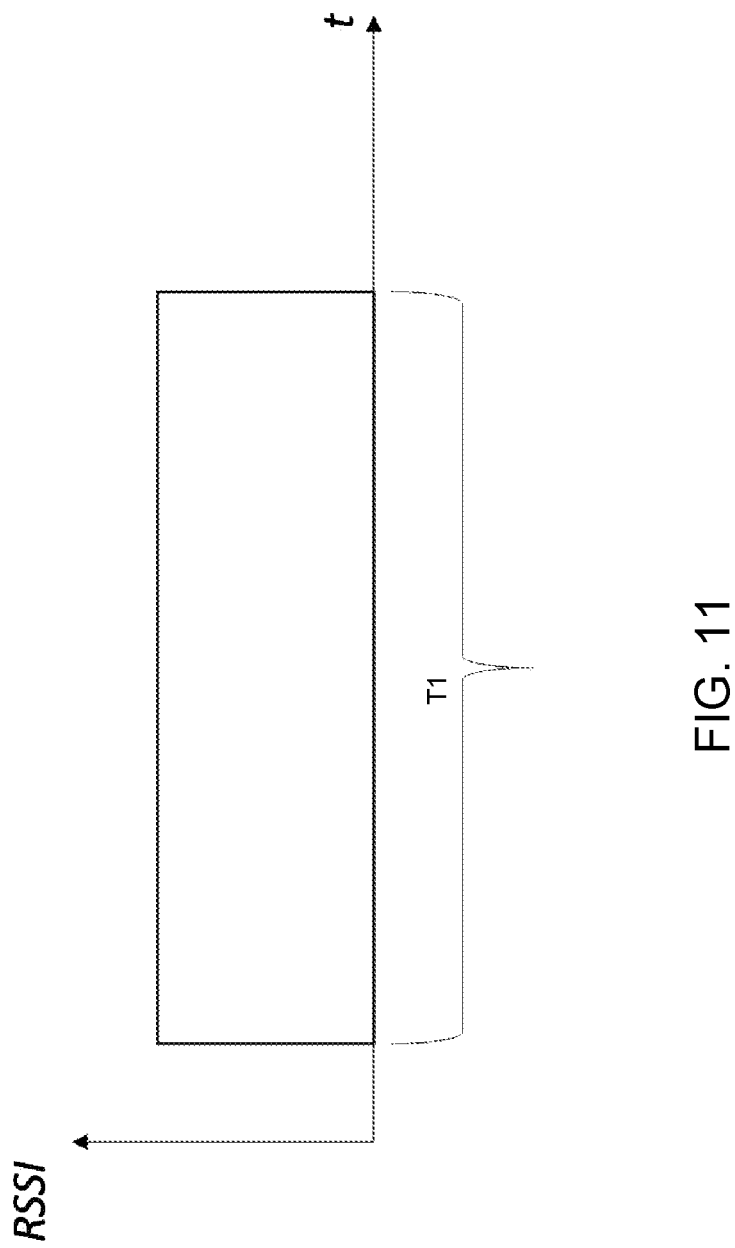
FIG. 11 is a diagram illustrating an estimated power spectral density (PSD) during T1 when RS is transmitted over reduced bandwidth only according to another embodiment of the present disclosure.

As an example, the estimated energy may result in a power spectral density (PSD) plot that may resemble, for example, FIG. 11. The PSD is the total power per unit bandwidth over which the energy is estimated by the wireless device 16. Here it may be assumed that the estimated energy from the RS transmission is in the center-frequency only, or in the part of the cell bandwidth where the synchronization signals are transmitted. Because the RS may always be transmitted in this region in some embodiments, there may be small variations in the energy level.

Figure 12:
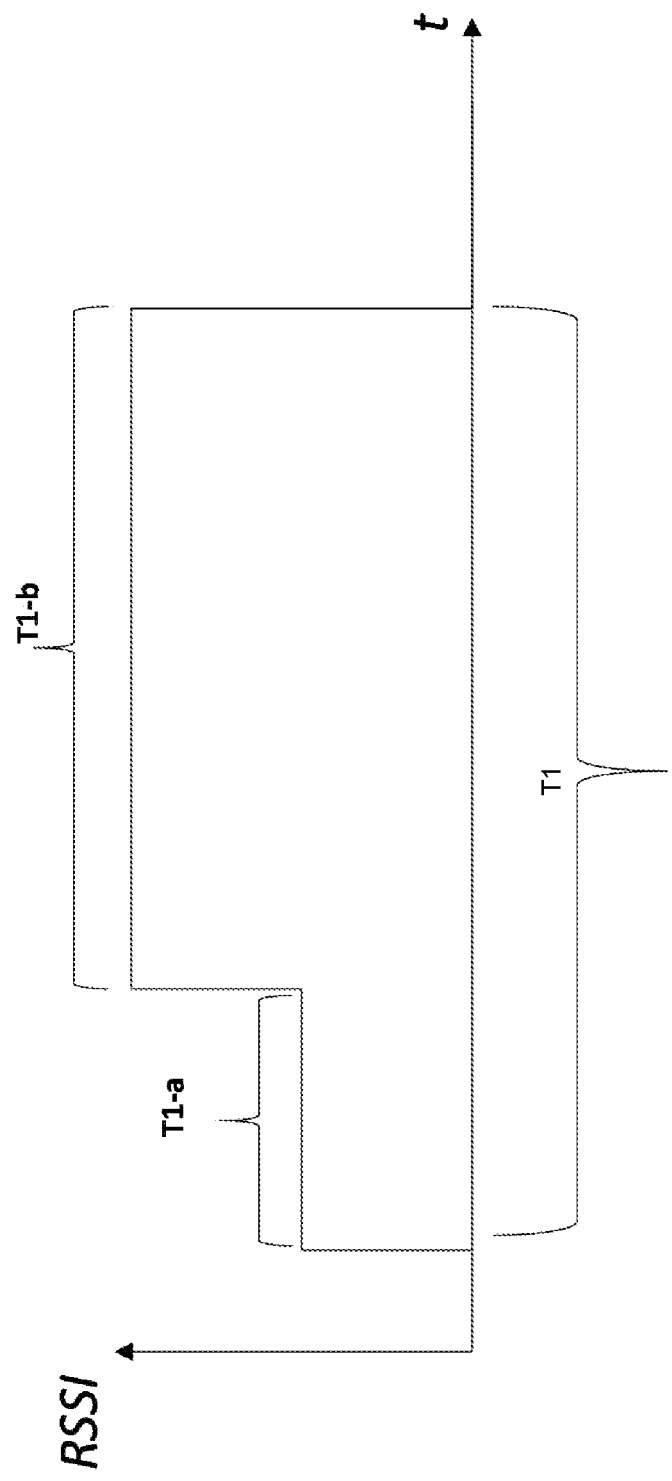
FIG. 12 is a diagram illustrating an estimated PSD during T1 when RS is transmitted (starting from T1-*b*) over full BW or bandwidth configured for WD reception in addition to the RS transmissions over fixed and reduced bandwidth, according to an embodiment of the present disclosure.

However, if the energy is estimated during another time period of the same length (T1) at the same time as when the system information block type 1 (SIB1) or random access channel (RACH) opportunities are transmitted, then the estimated PSD may look different, for example, as shown in FIG. 12. In FIG. 12, the estimated energy level increases in period T1-$b$ compared to T1-$a$ because in T1-$b$ SIB1 transmissions are scheduled and the network provides RS transmissions over the full bandwidth during this time. Because RSs are transmitted over larger number of RBs, this results in a higher received energy level in the wireless device 16.

Step 3

In this step, the wireless device 16 may estimate at least one second energy level over at least one instance of a second time period (e.g., T2) within a carrier frequency. For example, the wireless device 16 may estimate the received/detected energy (e.g., P2$i$ set) over a K number of successive time periods, T2, within T1 and within a certain carrier frequency (e.g., tuned over certain part of the frequency band such as over WD RF BW as described herein above). The values of P1 and P2$i$ may be estimated over the same BW and over the same part of the frequency.

The parameters T1 and T2 are related in a sense that T2 is less than T1 (T2<T1). Since T1 also contains K number of second time periods (e.g., T2) K is therefore greater than two (K≥2) in some embodiments. In one specific example: T1=20 ms, K=10 and T2=2 ms. In another example: T1=20 ms, K=20 and T2=1 ms. If P2$i$ is estimated over all T2 within T1 then K=T1/T2. The set of estimated energy levels over T2 within T1 is denoted P2$i$, where i refers to the ith element in the K number of successive time periods within T2.

Figure 13:
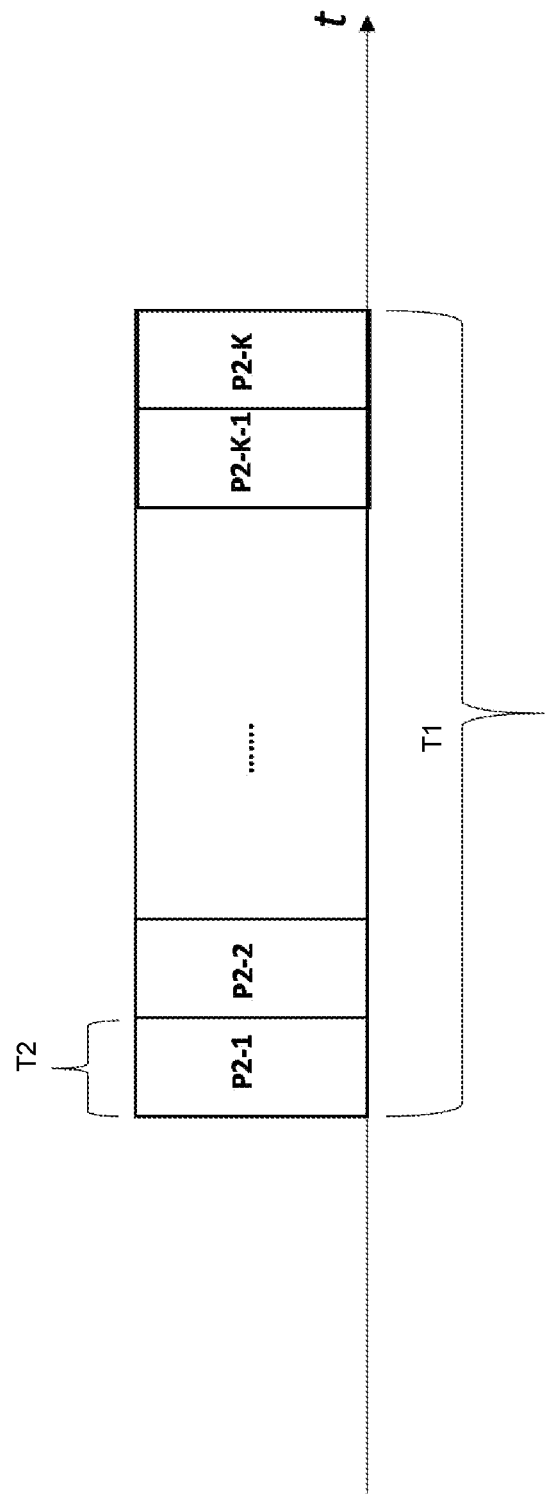
FIG. 13 is a diagram illustrating a relation between time period T1 and T2 according to one embodiment of the present disclosure.

The method for estimating the received/detected energy is the similar to those described in step 2 herein above, but there may be some differences. In one embodiment, the difference is that it is estimated over a shorter time period. An example of the relation between the estimated energy over T1 and T2 is illustrated in FIG. 13.

Step 4

In this step, a relation may be determined between the estimated first energy level and the estimated at least one second energy level. In one embodiment, the wireless device 16 determines the relation between the estimated energy level P1 over time period T1 and the set of estimated energy levels P2$i$ over the K time periods of length T2 (e.g., over K successive T2$s$ within T1).

The determined relation may be further used by the wireless device 16 to determine whether or not one or more cells operate on the carrier frequency (F1) over which P1 and the set P2$i$ are estimated by the wireless device 16.

The relation for determining whether one or more cells operate on F1 or not can be expressed using a general function (F) as follows: P=F(P1, P2i, ∂), where ∂ is a margin that may depend on several factors, for example, the WD category, a receiver bandwidth, interference level in the network, P1, etc. For example, if P1 is above a certain threshold (e.g., P1=MAX (P2i)) then ∂=0. This parameter may be a fixed or configurable parameter by the network side. The fixed value can be pre-defined, or autonomously determined by the wireless device 16.

One specific realization or example of such function or relation can be expressed as: IF: MAX (P2i)≥(P1+∂), then the wireless device 16 assumes that one or more cells operate on F1 (e.g., BW over which P1 and P2i are estimated), ELSE: the wireless device 16 assumes that no cell operates on F1; where MAX (P2i) corresponds to the largest estimated value out of the K successive time periods within T1. The wireless device 16 may apply the same function to compare the estimated energy level of P1 and P2i if X-percentile is used. For example, if X-percentile is used for determining the level of P1 then it can use the same function for P2i.

The outcome of this step can be an absolute value indicating the relation between the two estimated power levels (e.g., the difference between the max (P2i) and P1, between P2i and P1+∂, etc. In some embodiments, it can also be a bit indicator that indicates whether the condition is met or not.

Step 5

In this step, which is optional, the wireless device 16 uses the outcome of the determined relation between P1 and set P2i (in step 4) to further decide whether the wireless device 16 should perform cell search over the frequency F1.

For example, if the wireless device 16 determines that one or more cells operate on F1 then the wireless device 16 shall proceed with the next step of performing a cell search for searching cells on F1. But if the wireless device 16 determines that no cell operates on F1 then the wireless device 16 shall not perform any cell search for searching cells on F1.

For performing the cell search, for example, the wireless device 16 shall correlate the received signal on F1 with a set of pre-defined sequences corresponding to a physical cell identity. The wireless device 16 will attempt to detect the time instant at which the synchronization signals are transmitted in the cell and eventually find the physical cell ID of that cell.

In yet another exemplary embodiment, a method in a wireless device 16 attempting to access a cell comprises at least one or more of the following steps:

Step 1: Obtain information about a first time period (T1) and a second time period (T2) based on, for example, a pre-defined rule.

Step 2: Estimate the PSD of the band one or more instances of the second time period (T2) over the first time period (T1). In a further embodiment, estimate the PSD several times at least every T2 ms (e.g., T2 is 2 ms) during the time T1 (e.g., T1 is 20 ms).

Step 3: Determine one or more carrier frequencies in the frequency band by comparing an expected bandwidth pattern to a measured bandwidth pattern, the measured bandwidth pattern corresponding to the estimated PSD of the frequency band. For example, in a further embodiment, one or several carrier frequencies in the frequency band are detected where:

transmissions are continuous in the frequency carriers corresponding to a BW of the center resource blocks; and/or there is at least one measurement sample during the T1 ms long measurement sequence where the PSD shows a signal with BW equal to a full system BW, which might not be known to be symmetric around the continuous transmission estimated as described above.

Step 4: Based on the determined relation identify the frequencies that may be center frequencies of a transmitted signal from a cell.

The above steps are described herein below in more detail.

Step 1

This may be implemented identically or similar to step 1 in the first embodiment described herein above. In this step, the wireless device 16 may obtain parameters which are related to energy detection as part of the band scanning procedure. Examples of such parameters are a first time period (T1) and a second time period (T2). The wireless device 16 can obtain these parameters based on any of, for example: a pre-defined information, wireless device 16 autonomous determination, and/or information received by the wireless device 16 from the network node 14 (e.g., provided to the wireless device 16 when the wireless device 16 was previously camped on a cell). The parameter T1 may correspond to a periodicity with which RSs are transmitted over full bandwidth over T2. For example, if RS is transmitted over 1 subframe at least once every 20 ms then T1=20 ms and T2=1 ms.

Step 2

In this step, the wireless device 16 may not be connected or camped to any cell, nor may it have any prior knowledge about the cell it tries to access. This procedure is also known as initial access, initial cell search, band scanning, frequency scanning, etc. This procedure may take place when the wireless device 16 has, for example, lost its serving cell, or when the wireless device 16 switches ON the device.

Typically, the wireless device 16 is configured with different bands that the operator and the device supports, and the bands may have different priorities according to which wireless device 16 scans in order to detect cells.

The wireless device 16 estimates the PSD by running several FFT executions over the complete frequency band. Each FFT execution is calculating the PSD over the BW supported by the wireless device 16. In the next execution the center frequency may be moved by the BW supported by the wireless device 16. With this PSD combined from the different FFT executions estimating the power distribution over the entire band, it is possible to detect where cell with high probability can be detected by any one or more of the following means, for example:

by calculating several PSDs separated in time by not more than T2 ms over total time T1 ms, with several FFT calculations per PSD estimations of the received signal over the full frequency band as described herein above; and/or determine, using these estimations, how the signal BW varies over time and thereby where the center frequency of the carrier frequency is located.

The PSD estimation may be performed by the wireless device 16, for example, every T2 ms over T1 ms within the searched frequency band. In step 2 of the first embodiment examples are given on how T1 is set and what it is associated with. The same examples are valid for this second embodiment. The estimation results in a PSD that gives an indication about the strength of the estimated signal for each frequency.

The wireless device 16 may use different functions to estimate the carrier frequency of certain transmitted signals.

Figure 14:
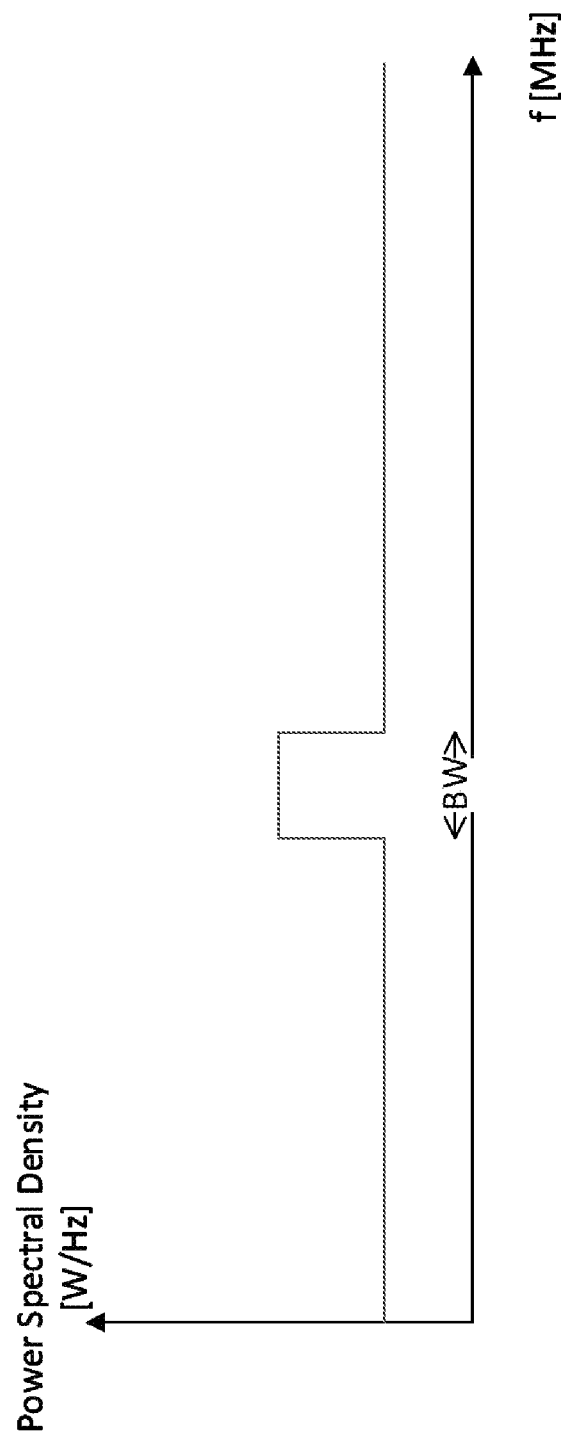
FIG. 14 is a diagram illustrating an estimated PSD of one exemplary cell when RS is transmitted over reduced bandwidth only, according to an embodiment of the present disclosure.

As an example, the estimated energy may result in a PSD plot that can resemble, for example, FIG. 11. The PSD is the total power per unit bandwidth over which the energy is estimated by the wireless device 16. Here, it may be assumed that the estimated energy from the RS transmission is in the center-frequency only, or in the part of the cell bandwidth where the synchronization signals are transmitted. Since, in some embodiments, the RS is always transmitted in this region, there may be small variations in the energy level. FIG. 14 shows an example of an estimated PSD of one cell when RS is transmitted over reduced bandwidth only.

There may be other occasional transmissions during this period as well, but it is only the center RBs that are transmitted continuously over time, so that will change between the PSD samples.

Figure 15:
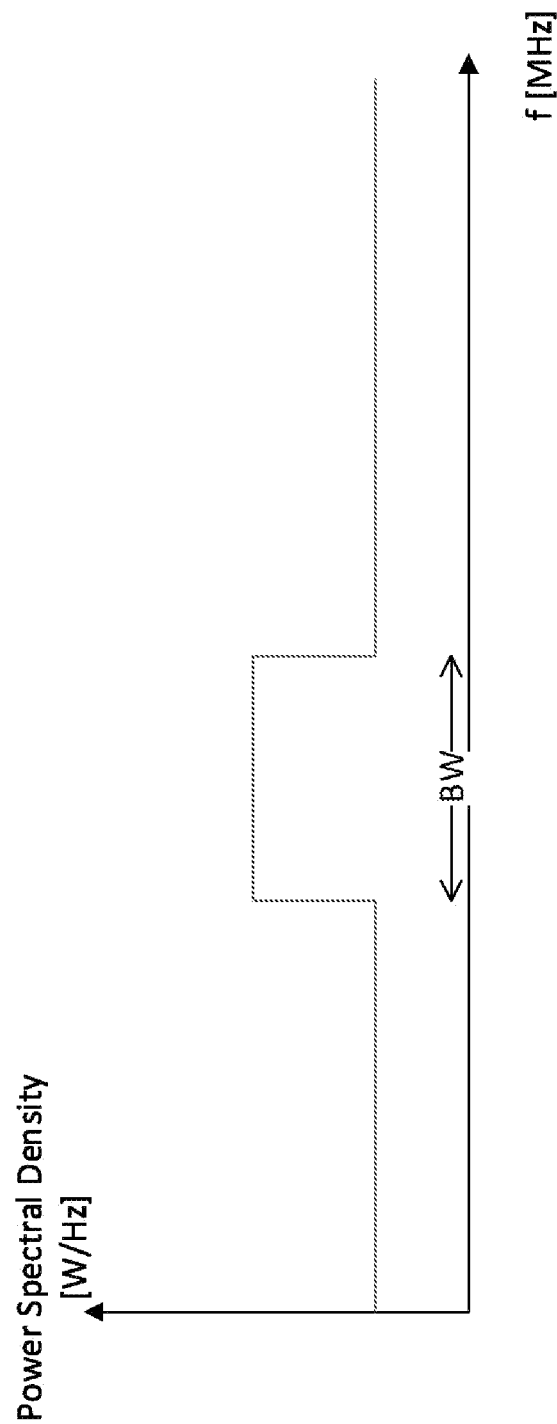
FIG. 15 is a diagram illustrating an estimated PSD during another PSD sample when RS is over full BW or bandwidth configured for WD reception in addition to the RS transmissions over fixed and reduced bandwidth, according to yet another embodiment of the present disclosure.
Figure 16:
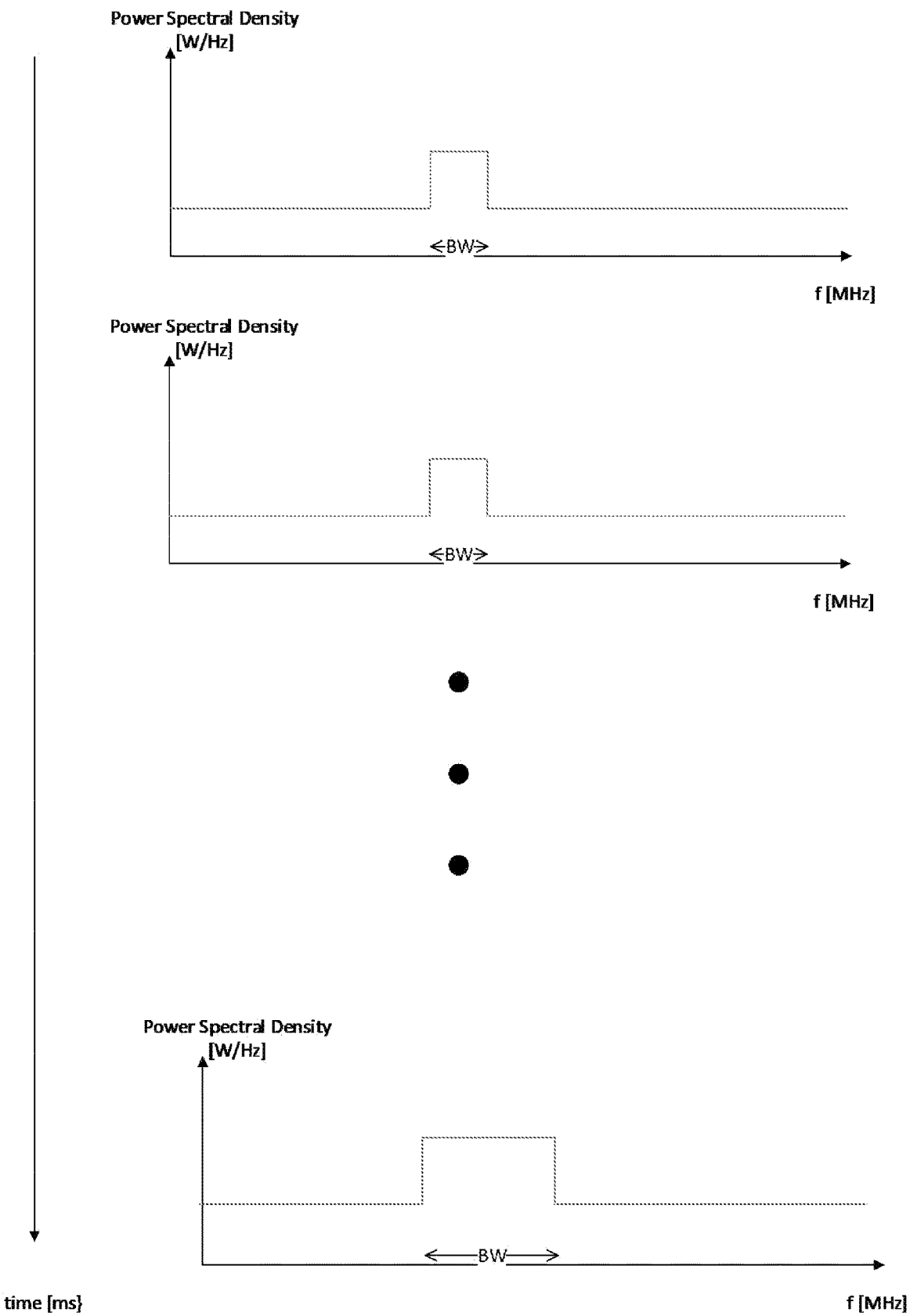
FIG. 16 is a diagram illustrating a sequence of PSDs during T1 according to one embodiment of the present disclosure.

When the PSD is estimated during another time period during the T1 period at the same time as the SIB1 or RACH opportunities are transmitted, then the estimated PSD may look different (e.g., as in FIG. 12). In FIG. 12, the estimated BW covers the whole/full system BW because during this sample SIB1 transmissions are scheduled and the network may provide RS transmissions over the full bandwidth during this time. FIG. 15 shows an example of an estimated PSD during yet another PSD sample when the RS is over full BW configured for WD reception in addition to the RS transmissions over fixed and reduced BW. FIG. 16 shows an example of a sequence of PSDs during T1 ms corresponding to a BW pattern (e.g., an estimated BW pattern matching an expected BW pattern).

Step 3

In this step, one or more carrier frequencies in the frequency band may be determined by comparing an expected bandwidth pattern to a measured bandwidth pattern. The measured bandwidth pattern may correspond to the estimated power spectral density of the frequency band, as discussed, for example, in the step above. Stated another way, the wireless device 16 estimates the carrier frequencies.

The expected bandwidth pattern may correspond to a predetermined bandwidth pattern, such as, for example, a BW pattern that should result when estimating PSDs on a cell's frequency carrier in lean carrier operation. An indication of the expected bandwidth pattern may be stored in the WDs 16 non-transitory memory so that the wireless device 16 can perform comparisons to measured BW patterns when attempting to access a cell according to embodiments of the present disclosure. In one embodiment, when a signal with estimated BW corresponding to the BW used when the RS is transmitted in a limited BW on a certain frequency carrier is detected in all PSD estimations, and the BW of the signal is broader during one or several contiguous PSD samples taken every instance of the second time period (e.g., T2 ms) during the first time period (e.g., T1 ms, then it is probable that a cell with the properties as above is available.

Step 4

In this step, which may be considered optional in some embodiments, the wireless device 16 uses the outcome of the determined estimated probable carrier frequencies to decide where to perform the cell search. For example, if the wireless device 16 determines that there are a number of probable carrier frequencies the wireless device 16 can start cell searching on the strongest probable carrier. Another option is that the wireless device 16 knows that it has camped on some of these carriers before so it may start cell search on the corresponding probable carrier.

For performing the cell search, for example, the wireless device 16 shall correlate the received signal on F1 with a set of pre-defined sequences corresponding to the physical cell identity. The wireless device 16 will attempt to detect the time instant at which the synchronization signals are transmitted in the cell and eventually find the physical cell ID of that cell.

In yet another exemplary embodiment for a network node 14 (e.g., eNodeB), there is described herein a method performed by the network node 14, which can be summarized as follows:

Step 1: Determine a need for full bandwidth RS transmissions in a cell which operates in a lean carrier operational mode. Stated another way, the network node 14 may identify one or more time periods for transmitting a reference signal over full bandwidth and also may identify one or more time periods for transmitting a reference signal over reduced bandwidth, as in lean carrier operational mode.

Step 2: Determining a pattern for full bandwidth RS transmissions in the cell. Stated another way, the network node 14 may determine the BW pattern based on the identification of the one or more time periods in step 1 above.

Step 3: Transmit an RS according to the determined pattern in step 2 above.

Step 4: Receive an initial access request from a wireless device 16 attempting to access the cell.

These steps are described herein in more detail below.

Step 1

In this step, the network node 14 may determine the need to transmit an RS over the full bandwidth in cell (e.g., cell 1) which is configured to operate in lean carrier operational mode. This embodiment may be based on the assumption that the RS is transmitted over reduced bandwidth (e.g., as in lean carrier operation) in the cell operating on a carrier frequency F1. In lean carrier operational mode there may also be occasions when the network node 14 is required to transmit the reference signals over the entire cell bandwidth. Some of these occasions where the RS is sent over full cell BW may include without limitation: subframe containing SIBs; paging occasions; subframes where physical downlink shared channel (PDSCH) is scheduled, DRX ON durations, configured machine-type communication (MTC) physical downlink control channel monitoring (MPDCCH) monitoring, random access channel (RACH) occasions (e.g., during Msg 2/4 reception), and the like.

RS transmissions over larger bandwidth may also occur during the warm up period and cool down period (e.g., before MSG1 in the physical random access channel (PRACH) to allow the wireless device 16 to estimate the channel). In some cases, the network node 14 may still have to provide RS transmissions over the full bandwidth (Bc) for a duration of time Ts (e.g., 4 ms) on frequency F1 for supporting certain procedures (e.g., to enable WDs 16 to perform band scanning). In one example, the network node 14 may determine the wireless device 16 for transmitting RS over full BW based on the presence of certain types of WDs 16 (e.g., estimating a certain number of legacy devices or other devices that do not support a CRS muting feature or that cannot perform all procedures in a cell with lean carrier operation). The network node 14 can detect the presence of such WDs 16 based on statistics, past history, etc. Another example is the case in which the network operates with two or more frequency carriers. If the network is configured to encourage a wireless device 16 to camp on to a specific carrier frequency, the network node 14 can transmit RSs over the full bandwidth more frequently so that the wireless device 16 can search this carrier with high probability.

Step 2

In this step, the network node 14 may determine a pattern according to which the network node 14 should transmit full BW in the cell on F1 (e.g., when, for how long, and the periodicity when full bandwidth transmissions should be transmitted in the cell). The pattern indicates at least when in time the network node 14 is required or otherwise decides to provide full bandwidth RS transmissions. For example, the pattern may comprise of at least the following parameters:

The periodicity with which the RS is to be transmitted over full BW of the cell. For example, the full bandwidth RS transmission can take place periodically once every time period (Tc) (e.g., Tc=20 ms).

The time duration (Ts) over which the RS is to be transmitted over full BW in every period, Tc.

The values of Tc and Ts can be predefined or configurable by the network node 14. When they are configurable, they can depend on several factors such as signal quality, type of operation, or procedure for which the RS will be used (e.g., band scanning).

The parameters Tc and Ts may further be associated with occasions during which the transmission and/or reception of certain types of signals can take place in the cell. These occasions are in turn related to certain procedures (e.g., a random access (RA) procedure, an SIB transmission in the cell, etc.). Examples of such occasions include without limitation RA transmission opportunity, SIB transmission duration, and the like. For example, Tc may correspond to the longest possible RA transmission periodicity. This is extensively explained in step 2 of the wireless device 16 embodiments discussed herein above. The same explanation and examples apply here as well in some embodiments. The wireless device 16 may these parameters Tc and Ts to determine the corresponding values of T1 and T2 respectively for energy detection for the purpose of band scanning. For example, the wireless device 16 may determine T1 and T2 as follows: T1=Tc and T2=Ts.

In addition to the full bandwidth or larger bandwidth RS transmission, the network node 14 may also provide RS transmissions over a number of subframes before the identified occasions above and after. In some embodiments, the periods are called pre-amble (or warm-up period) and post-amble (or cool down period).

In other examples, the network node 14 may transmit RS over a larger bandwidth over Ts which is smaller than the full bandwidth. For example, it may transmit the RS over the bandwidth where the wireless device 16 is configured for reception in addition to the RS transmission that takes place in the bandwidth where synchronization signals are transmitted.

The determined pattern in this step may further map to the different occasions (and their pre-amble and post-ample periods) as identified in the previous step. For example, the paging and system information transmission may take place following a certain periodicity. As an example, the determined pattern would correspond to that periodicity (Tc) and the duration of SIB including pre-amble and post-amble would correspond to the duration Ts. For example, if SIB periodicity is 80 ms then Tc=80 ms. If SIB duration is 1 ms, the preamble is 2 ms and post-amble is 1 ms then Ts=2 ms (SIB duration). However, the wireless device 16 may assume T1=Ts while T2=4 ms (duration of SIB and post and preamble subframes).

In another example, a rule may be determined that the wireless device 16 whose BW is less than the cell BW shall assume that RS is transmitted over N1 number of time resources (e.g., 2 ms) once every longest period of the RA transmission opportunity in the cell.

Step 3

In this step, the network node 14 may transmit the RS over the bandwidth following the determined pattern in the previous step.

Step 4

In this step, which may be considered optional in some embodiments, the network node 14 receives requests from wireless devices 16 which have initially identified the cell according to embodiments of the present disclosure (as discussed herein above with reference to wireless device 16 embodiments) and are trying to access the cell. This can be a result of the periodic or aperiodic light up of RS transmissions over the full bandwidth, or it can also be because the wireless device 16 has succeeded to detect the cell based on the RS transmission over the reduced bandwidth. The network node 14 may process the RA request based on its content and transmit a random access response (RAR) message.

Some Additional Embodiments

Embodiment A1: A method for a wireless device the method comprising: determining a first time period and a second time period, the second time period being less than the first time period;

estimating a first energy level over the first time period within a carrier frequency;

estimating at least one second energy level over at least one instance of the second time period within the carrier frequency;

determining a relation between the estimated first energy level and the estimated at least one second energy level; and determining whether one or more cells are operating over the carrier frequency based on the determined relation.

Embodiment A2: The method according to Embodiment A1, wherein estimating the at least one second energy level comprises:

estimating the at least one second energy level over successive instances of the second time period within the carrier frequency.

Embodiment A3: The method according to any one of Embodiments A1 and A2, further comprising:

in response to determining that the one or more cells are operating over the carrier frequency, performing a cell search on the carrier frequency.

Embodiment B1: A method for a wireless device, the method comprising:

determining a first time period and a second time period, the second time period being less than the first time period;

estimating a power spectral density, PSD, of a frequency band one or more instances of the second time period during the first time period; and determining one or more carrier frequencies in the frequency band by comparing an expected bandwidth pattern to a measured bandwidth pattern, the measured bandwidth pattern corresponding to the estimated power spectral density of the frequency band.

Embodiment B2: The method according to Embodiment B1, wherein estimating the PSD comprises:

estimating the PSD of the frequency band every instance of the second time period during the first time period.

Embodiment B3: The method according to any one of Embodiments B1 and B2, further comprising:

identifying a center frequency of a signal transmitted by a network node based on the determination of the one or more carrier frequencies in the frequency band.

Embodiment B4: The method according to any one of Embodiments B1 B2 and B3, further comprising;

in response to determining the one or more carrier frequencies in the frequency band, performing a cell search on at least one of the one or more carrier frequencies.

Embodiment B5: The method according to Embodiment B1, wherein:

the expected bandwidth pattern is a predetermined bandwidth pattern corresponding to a lean carrier operation.

Embodiment B6: The method according to Embodiment B1, wherein:

the expected bandwidth pattern is a predetermined bandwidth pattern corresponding to a reference signal transmission pattern.

Embodiment B7: The method according to Embodiment B6, wherein:

the reference signal transmission pattern corresponds to a transmission by a network node over a reduced bandwidth during a discontinuous reception (DRX) inactive time period, as compared to a bandwidth during a DRX active time period.

Embodiment C1: A method for a network node configured for lean carrier operation, the method comprising:

identifying one or more time periods for transmitting a reference signal over a full bandwidth;

determining a bandwidth pattern based on the identifying the one or more time periods; and transmitting a reference signal according to the bandwidth pattern.

Embodiment C2: The method according to Embodiment C1 further comprising:

identifying one or more: time periods for transmitting the reference signal over a reduced bandwidth, the determining the bandwidth pattern further includes determining the bandwidth pattern based on identifying the one or more time periods for transmitting the reference signal over the full bandwidth and based on identifying the one or more time periods for transmitting the reference signal over the reduced bandwidth.

Embodiment C3: The method according to any one of Embodiments C1 and C2, further comprising:

after transmitting the reference signal, receiving an initial access request from a wireless device attempting to communicate with the network node.

Embodiment D1: A network node comprising processing circuitry configured to cause the network node to perform any of the method of Embodiments C described above.

Embodiment D2: A wireless device comprising processing circuitry configured to cause the wireless device to perform any of the methods of Embodiments A and B described above.

Embodiment D3: A wireless device, comprising:

a determining module configured to:

determine a first time period and a second time period, the second time period being less than the first time period;

determine a relation between an estimated first energy level and at least one second energy level; and determine whether one or more cells are operating over the carrier frequency based on the determined relation; and an estimating module configured to:

estimate the first energy level over the first time period within a carrier frequency; and estimate the at least one second energy level over at least one instance of the second time period within the carrier frequency.

Embodiment D4: A wireless device, comprising:

a determining module configured to:

determine a first time period and a second time period, the second time period being less than the first time period; and determine one or more carrier frequencies in a frequency band by comparing an expected bandwidth pattern to a measured bandwidth pattern, the measured bandwidth pattern corresponding to an estimated power spectral density of the frequency band; and an estimating module configured to:

estimate the power spectral density of the frequency band at least every instance of the second time period during the first time period.

Embodiment D5: A network node, comprising:

an identification module configured to identify one or more time periods for transmitting a reference signal over a full bandwidth;

a determination module configured to determine the bandwidth pattern based on the identifying the one or more time periods; and a transceiver module configured to transmit a reference signal according to the bandwidth pattern.

As still other examples, it has been considered that CRS transmissions be provided in the center 6 physical resource blocks (PRBs) by the network. In addition, the CRS transmissions may also be provided over the part of the cell bandwidth where the WD (e.g., WD 16) may be configured for reception or transmissions as listed below, for example:

Subframe including system information blocks (SIBs);
Paging occasions;
Scheduled subframes;
DRX ON durations;
Configured MPDDCH monitoring;
RACH occasions (e.g. during Msg 2/4 reception); and
Possibly, additional CRS for CSI measurement in subframes outside the MPDCCH search space.

In Long Term Evolution (LTE) networks, minimizing the inter-cell interference can help increase the chances that downlink higher order modulation (64 QAM, 256 QAM) can be utilized to increase the downlink throughput for users experiencing good coverage conditions. This is achieved in Rel-15 by muting the CRS transmissions outside the WD narrowband/wideband. However, the CRS signals may always be transmitted in the center 6 PRBs. The CRS muting may be applied except in following scenarios:

Subframe including the SIBs and the subframe(s) preceding SIBs. CRS transmission over the WD radio frequency (RF) bandwidth might be needed for the WD to do the automatic gain control (AGC) and channel estimation. The number of subframes preceding the SIBs is also called "warm up" period.
Paging occasions and the subframe(s) prior to paging occasions.
Scheduled subframes and the subframe(s) in advance.
During connection set up from X subframe prior to Msg2 until DRX configuration is sent to the WD.
DRX ON-durations and the subframe(s) in advance.

In addition to the "warm up" period that takes place before the occasions listed above, there may also be need for a "cool down" period as well. The CRS transmission over the whole WD channel bandwidth can also be provided during this time.

Figure 17:
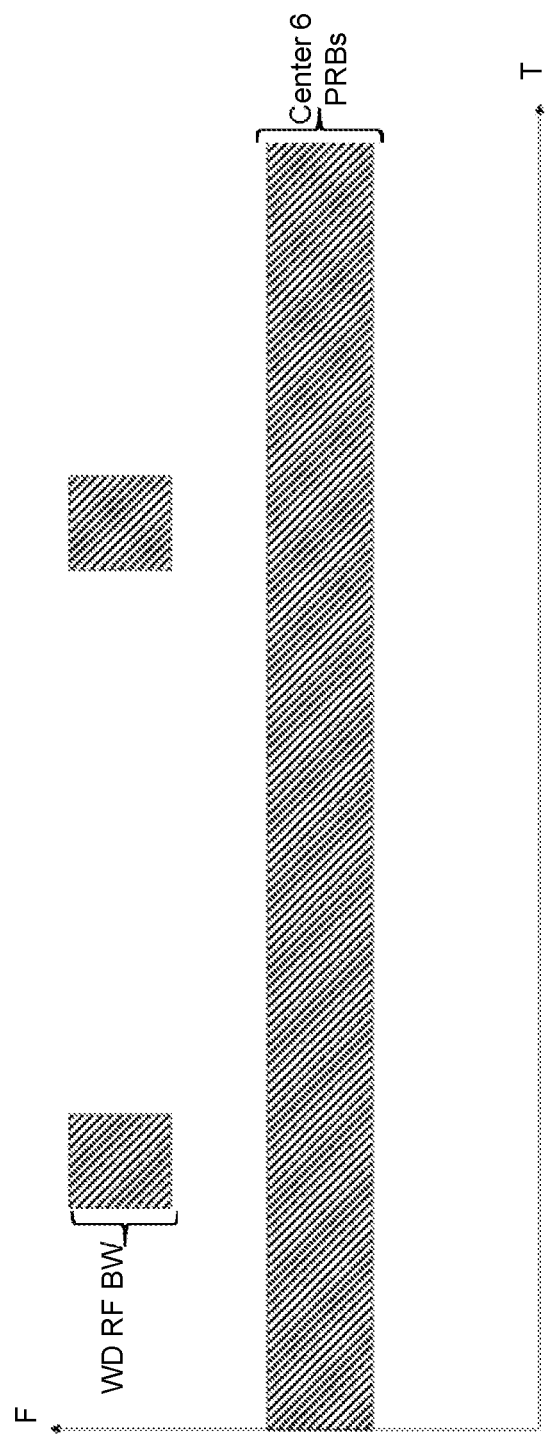
FIG. 17 is a diagram illustrating cell-specific reference signal (CRS) muting over time and frequency domain.

An example of the CRS muting concept is shown in FIG. 17, illustrating that CRS transmission may always take place in the center 6 PRBs while they are also transmitted only over the WD RF bandwidth from time to time (e.g., in DRX ON durations, in warm-up and cool-down period).

In one embodiment, CRS muting for MTC may include definitions for the:

Minimum amount(s) of CRS; and
Value(s) of X corresponding to number of the PRBs outside the narrowband/wideband used by BL WDs for CRS.

And prior to the following uplink transmission occasions:
Random Access;
Sounding Reference Signal (SRS); and
Physical Uplink Control Channel (PUCCH)/Physical Uplink Shared Channel (PUSCH).

Reduction of CRS transmissions to reduced bandwidth (i.e., the center 6 PRBs) can be enabled based on WD capability indication. The WD (e.g., WD 16) can indicate its capability related to whether its RF bandwidth is same as the bandwidth specified as WD channel bandwidth, e.g., 1.4 MHz for WD DL Cat-M1. For example, it can signal to the network (e.g., network node 14) whether its receiver bandwidth is of 1.4 MHz or not. This information can be used by the network to decide whether to transmit the CRS over the full cell bandwidth or reduced cell bandwidth. This may work fine in CONNECTED mode where the WD can make such signalling.

However, one issue is whether WD initial access procedure might be impacted due to CRS muting. In initial access, the WD has no prior knowledge of time-frequency resources over which the cell operates which it tries to access. It is in the center frequency that the synchronization signals which contain the necessary information such as frame boundary, time/frequency information among others of the cell are transmitted. According to 3GPP specifications, the network node can set the center frequency every 100 kHz (channel raster). But the WD does not know the exact center-frequency location in the frequency band, thus the WD typically scans the frequency range and calculates the detected energy in that range. If the calculated power exceeds a threshold, the WD assume the LTE channel is available in this frequency region and then starts initial cell search process every 100 kHz step.

In some embodiments, the overall initial access procedure may not be very impacted by the CRS muting feature for various reasons as discussed herein. Firstly, it shall be noted that the CRS transmissions are generally always transmitted in the center frequency. This means a WD can still use the legacy method of frequency sensing to detect presence of new LTE cells in parts of spectrum where the WD RF is tuned. However, the detected energy level might be lower compared to a case where full bandwidth CRS transmissions are provided. This may for example require some changes in the threshold values used to detect the presence of new cells.

Secondly, it has been considered that CRS transmissions are also provided in parts of the cell bandwidth where the WD reception is configured at different occasions. However, the WD may not be tuned to this part of the bandwidth where CRS is transmitted since the WD has not accessed or not read the system information at this stage. Depending the tuned RF bandwidth, the WD may detect variations in the calculated power spectrum density (PSD), but this may be time-varying.

Thirdly, the network node can be expected to provide CRS transmissions over the WD bandwidth of WD Cat-M1/M2 before the random access (RA) opportunity to enable the WD to derive the uplink (UL) timing e.g., during the warmup period. The network may be aware of the part of the cell BW where the WD Cat-M1/M2 is configured also in idle mode (e.g., the paging occasions). Random access opportunities can be configured with different periodicities.

The RA opportunity can be configured as frequent as in every subframe (e.g. PRACH Configuration Index #14) or as sparse as once every 20 ms (e.g., PRACH Configuration Index #0).

To assist the WD Cat-M1/M2 to perform an initial access (e.g., band scanning) some embodiments of this disclosure provides that the CRS are transmitted over full cell BW in one downlink (DL) subframe every 20 ms. This DL subframe with CRS over full BW can be transmitted before a RA opportunity which occurs once every 20 ms regardless of the actual RA configuration used. This means CRS will be transmitted only over the WD Cat-M1/M2 BW before RA opportunities which occur at periodicity less than 20 ms.

Figure 18:
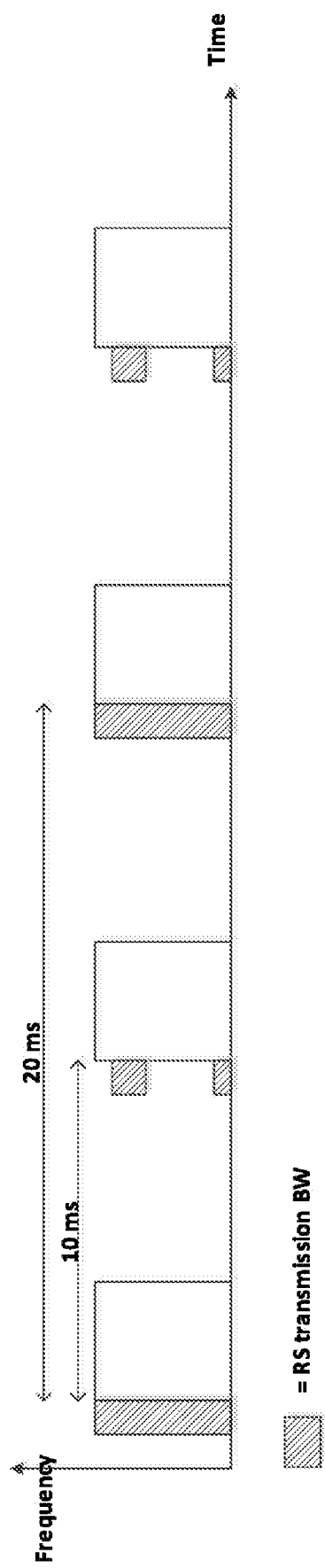
FIG. 18 is a diagram illustrating reference signal (RS) transmission over different parts of a cell bandwidth during random access (RA).

An example of CRS transmission over full BW (e.g., every 20 ms) and over WD BW every 10 ms is shown in FIG. 18. In this example, it is assumed that the RA occurs in the cell once every frame. Code corresponding to this example may include the following:

```
PRACH-ConfigInfo ::=           SEQUENCE {
   prach-ConfigIndex              INTEGER (0..63),
   highSpeedFlag                  BOOLEAN,
   zeroCorrelationZoneConfig      INTEGER (0..15),
   prach-FreqOffset               INTEGER (0..94)
}
```

Table 5.7.1-2 of Technical Specification (TS) 36.211 is shown below for discussion purposes.

TABLE 5.7.1-2

Frame structure type 1 random access configuration for preamble formats 0-3 (from TS36.211)

| PRACH Configuration Index | Preamble Format | System frame number | Subframe number |
| --- | --- | --- | --- |
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |

TABLE 5.7.1-2-continued

Frame structure type 1 random access configuration for preamble formats 0-3 (from TS36.211)

| PRACH Configuration Index | Preamble Format | System frame number | Subframe number |
|---|---|---|---|
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |
| 62 | N/A | N/A | N/A |
| 63 | 3 | Even | 9 |

Observation #1: CRS is transmitted over full BW in at least one DL subframe every 20 ms e.g., before RA opportunity that occurs every 20 ms.

In summary, initial access may not be highly impacted for cat-M1/M2 devices when CRS transmissions are reduced to a certain bandwidth and such devices are lit up over the full bandwidth periodically at different occasions. This periodic light up should assist these devices to perform the initial cell search or band scanning.

Observation #2: No significant impact on the initial access is foreseen for Cat-M1/M2 WDs when CRS muting is employed in the cell.

This disclosure includes arrangements for the WD initial access using frequency scanning when the CRS muting is applied in the target cell. It has been observed that the current procedure may also work under CRS muting.

Observation #1: CRS is transmitted over full BW in at least one DL subframe every 20 ms e.g., before RA opportunity that occurs every 20 MS.

Observation #2: No significant impact on WD initial access is foreseen for Cat-M1/M2 WDs when CRS muting is employed in the cell.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

DMRS Demodulation Reference Signal
CRS Cell-Specific Reference Signal
MBSFN Multi-Broadcast Single-Frequency Network
RS Reference Signal
CSI-RS Channel State Information Reference Signal
NRS Narrowband Reference Signal
NPSS Narrowband PSS
NSSS Narrowband SSS
PRS Positioning Reference Signal
PT-RS Phase-Tracking Reference Signal
SSB Synchronization Signal Block
NR New Radio
ACK Acknowledged
ADC Analog-to-digital conversion
AGC Automatic gain control
ANR Automatic neighbor relations
AP Access point
BCH Broadcast channel
BLER Block error rate
BS Base station
BSC Base station controller
BTS Base transceiver station
CA Carrier aggregation
CC Component carrier
CG Cell group
CGI Cell global identity
CP Cyclic prefix
CPICH Common pilot channel
CSG Closed subscriber group
DAS Distributed antenna system
DC Dual connectivity
DFT Discrete Fourier Transform
DL Downlink
DL-SCH Downlink shared channel
DRX Discontinuous reception
EARFCN Evolved absolute radio frequency channel number
ECGI Evolved CGI
eNB eNodeB
FDD Frequency division duplex
FFT Fast Fourier transform
HD-FDD Half duplex FDD
HO Handover
M2M machine to machine
MAC Media access control
MBB Mobile broadband
MCG Master cell group
MDT Minimization of drive tests
MeNB Master eNode B
MIB Master information block
MME Mobility management entity
MPDCCH Machine Type Physical Downlink Control Channel
MRTD Maximum receive timing difference
MSR Multi-standard radio
NACK Not acknowledged
NPDCCH Narrowband Physical Downlink Control Channel
OFDM Orthogonal frequency division multiplexing
SI System Information
PCC Primary component carrier
PCI Physical cell identity
PCell Primary Cell
PCG Primary Cell Group
PCH Paging channel
PDCCH Physical Downlink Control Channel
ePDCCH Enhanced Physical Downlink Control Channel
PDU Protocol data unit
PGW Packet gateway
PHICH Physical HARQ indication channel
PLMN Public land mobile network
PSCell Primary SCell
PSC Primary serving cell
PSS Primary synchronization signal
PRACH Physical Random Access Channel
RACH Random Access Channel
RAT Radio Access Technology
RF Radio frequency
RLM Radio link monitoring
RNC Radio Network Controller
RRC Radio resource control
RRH Remote radio head
RRU Remote radio unit
RSCP Received signal code power
RSRP Reference Signal Received Power
RSRQ Reference Signal Received Quality
RSSI Received signal strength indication
RSTD Reference signal time difference
RV Redundancy version
Rx Receiver
SCC Secondary component carrier
SCell Secondary Cell
SCG Secondary Cell Group
SeNB Secondary eNode B
SFN System frame number
SGW Signaling gateway
SI System information
SIB System information block
SIB1 System information block type 1
SNR Signal to interference and noise ratio
SON Self-organizing networks
SSC Secondary serving cell
SSS Secondary synchronization signal
TA Timing advance
TAG Timing advance group
TDD Time division duplex
Tx Transmitter
UARFCN UMTS Absolute Radio Frequency Channel Number
UE User equipment
UL Uplink
WD Wireless Device It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for a network node for lean carrier operation, the method comprising:
    identifying a first time period for transmitting a reference signal over a full cell bandwidth while operating in a lean carrier operational mode, the first time period being associated with a first energy level;
    identifying a plurality of time periods for transmitting the reference signal over a reduced cell bandwidth smaller than the full cell bandwidth while operating in the lean carrier operational mode, each time period of the plurality of time periods being a subperiod of the first time period and being associated with a respective energy level;
    transmitting the reference signal in the lean carrier operational made according to a bandwidth pattern, the bandwidth pattern being based at least in part on the identified first time period and plurality of time periods;
    and receiving an initial access request from the wireless device based on a maximum energy level of the respective energy levels of the plurality of time periods being greater than the first energy level by at least a predetermined threshold value.

2. A network node for lean carrier operation, the network node comprising processing circuitry configured to cause the network node to:
    identify at a first time period for transmitting a reference signal over a full cell bandwidth while operating in a lean carrier operational mode, the first time period being associated with a first energy level;
    identity a plurality of time periods for transmitting the reference signal over a reduced cell bandwidth smaller than the full cell bandwidth while operating in the lean carrier operational mode, each time period of the plurality of time periods being subperiod of the first time period and being associated with a respective energy level;
    transmit the reference signal in the lean carrier operational mode according to a bandwidth pattern, the bandwidth pattern based at least on the first time period and plurality of time periods;
    and receive an initial access request from the wireless device based on a maximum energy level of the respective energy levels of the plurality of time periods being greater than the first energy level by at least a predetermined threshold value.

3. The network node according to claim 2, wherein the processing circuitry is further configured to cause the network node to: identify at least one time period for transmitting the reference signal over a reduced bandwidth for the lean carrier operational mode.

4. The network node according to claim 3, wherein the transmitted reference signal comprises a cell-specific reference signal, CRS.

5. The network node according to claim 3, wherein the bandwidth pattern comprises a periodicity.

6. The network node according to claim 5, wherein the periodicity is 20 milliseconds, ms.

7. The network node according to claim 5, wherein the periodicity is 10 milliseconds, ms.

8. The network node according to claim 5, wherein the periodicity is based at least in part on at least one of a random access, RA, procedure and a system information block, SIB, transmission duration.

9. The network node according to claim 2, wherein the at least one time period for transmitting the reference signal over the full cell bandwidth in lean carrier operation corresponds to 1 millisecond.

10. A method for a wireless device, WD, for lean carrier operation, the method comprising:
    determining a first time period and a plurality of time periods, each time period of the plurality of time periods being a subperiod of the first time period;
    estimating a first energy level of a carrier frequency during the first time period;
    estimating a respective energy level for each time period of the plurality of time periods;
    determining a maximum energy level of the respective energy levels of the plurality of time periods;
    determining whether at least one cell is operating over the carrier frequency based at least in part on the determined maximum energy level being greater than the estimated first energy level by at least a predetermined threshold value;
    and performing a cell search on the carrier frequency based on determining whether the at least one cell is operating over the carrier frequency.

11. A wireless device, WD, for lean carrier operation, the WD comprising processing circuitry configured to cause the WD to:
    determine a first time period and a plurality of time periods, each time period of the plurality of time periods being a subperiod of the first time period;
    estimate a first energy level of a carrier frequency during the first time period;
    estimating a respective energy level for each time period of the plurality of time periods;
    determining a maximum energy level of the respective energy levels of the plurality of time periods;
    determine whether at least one cell is operating over the carrier frequency based at least in part on the determined maximum energy level being greater than the estimated a first energy level by at least a predetermined threshold value;
    and perform a cell search on the carrier frequency based on the determination of whether the at least one cell is operating over the carrier frequency.

12. The WD according to claim 11, wherein the first time period and the plurality of time periods correspond to a bandwidth pattern, the bandwidth pattern being based at least in part on a reference signal transmission over a full cell bandwidth in lean carrier operation.

13. The WD according to claim 11, wherein the first time period corresponds to a periodicity for a reference signal transmission over a full cell bandwidth in lean carrier operation.

14. The WD according to claim 13, wherein the reference signal transmission is a cell-specific reference signal, CRS, transmission by a network node.

15. The WD according to claim 13, wherein the periodicity of the reference signal transmission over the full cell bandwidth in lean carrier operation is 20 milliseconds, ms.

16. The WD according to claim 13, wherein the periodicity of the reference signal transmission over the full cell bandwidth in lean carrier operation is 10 milliseconds, ms.

17. The WD according to claim 11, wherein the c plurality of time periods correspond to a duration for a reference signal transmission over a reduced bandwidth in lean carrier operation.

18. The WD according to claim 17, wherein the reduced bandwidth is smaller than the full cell bandwidth.

19. The WD according to claim 17, wherein the duration for the reference signal transmission over the full cell bandwidth in lean carrier operation is 1 millisecond, ms.

20. The WD according to claim 11, wherein at least one of the first time period and the plurality of time periods corresponds to one of a random access, RA, periodicity and a system information block, SIB, periodicity.

21. The WD according to claim 11, the processing circuitry is further configured to cause the WD to perform the cell search on the carrier frequency by being configured to:
   in response to determining that the at least one cell is operating over the carrier frequency, perform the cell search on the carrier frequency.

22. The WD according to claim 11, wherein each of the first time period and the plurality of time periods is a predetermined time period.

23. The WD according to claim 11, wherein the processing circuitry is configured to estimate the respective energy levels by being further configured to cause the WD to:
   estimate a power spectral density, PSD, over the first time period and estimate a PSD over the plurality of time periods, each of the plurality of time periods corresponding to 1 millisecond.

\* \* \* \* \*